(12) United States Patent
Koski

(10) Patent No.: US 12,466,008 B2
(45) Date of Patent: Nov. 11, 2025

(54) AUTOMATED GEOMETRY AND CROWNING APPARATUS FOR USE OF MOBILE ELECTRIC FLASH-BUTT WELDING OF RAILROAD RAILS AND RAIL INSERTS

(71) Applicant: One Rail Group, LLC, Dallas, TX (US)

(72) Inventor: Kris Koski, Dallas, TX (US)

(73) Assignee: One Rail Group, LLC, Dallas, TX (US)

( * ) Notice: Subject to any disclaimer, the term of this patent is extended or adjusted under 35 U.S.C. 154(b) by 0 days.

(21) Appl. No.: 18/418,735

(22) Filed: Jan. 22, 2024

(65) Prior Publication Data

US 2024/0165750 A1 May 23, 2024

Related U.S. Application Data

(63) Continuation of application No. 17/738,839, filed on May 6, 2022, now Pat. No. 11,919,108.

(60) Provisional application No. 63/186,108, filed on May 8, 2021.

(51) Int. Cl.
*B23K 37/00* (2025.01)
*B23K 11/04* (2006.01)
*B23K 37/04* (2006.01)
*B23K 101/26* (2006.01)

(52) U.S. Cl.
CPC ........ *B23K 37/0452* (2013.01); *B23K 11/046* (2013.01); *B23K 2101/26* (2018.08)

(58) Field of Classification Search
CPC ............ B23K 37/0531; B23K 2101/06; B23K 37/0533; B23K 2101/10; B23K 9/028
See application file for complete search history.

(56) References Cited

U.S. PATENT DOCUMENTS

| | | | | |
|---|---|---|---|---|
| 2,737,140 A | * | 3/1956 | Totten | F16L 1/09 219/161 |
| 3,349,216 A | | 10/1967 | Paton et al. | |
| 3,425,614 A | * | 2/1969 | Clark | B23K 37/0531 228/44.5 |

(Continued)

FOREIGN PATENT DOCUMENTS

| CN | 1148484 C | 5/2004 |
|---|---|---|
| CN | 205147641 U | 4/2016 |

*Primary Examiner* — Erin B Saad
(74) *Attorney, Agent, or Firm* — Braxton Perrone, PLLC; Bobby W. Braxton; Gregory Perrone

(57) ABSTRACT

A Mobile Electric Flash-Butt (EFB) Welding apparatus that incorporates an automated geometry system which creates field/mobile EFB welds with proper vertical alignment, within a definable distance. The system has a first pair of adjustable reference points on a left side of a mobile welding apparatus. The system has a second pair of adjustable reference points on the right side of the welding apparatus. The system has a first lifting mechanism positioned between the first pair of adjustable reference points and a second lifting mechanism positioned between the second pair of adjustable reference points. The welding line is positioned between the first and second pair of adjustable reference points and is the location of the weld. The system allows for comparatively shorter inserts than previously utilized.

17 Claims, 28 Drawing Sheets

(56) References Cited

U.S. PATENT DOCUMENTS

| | | | | |
|---|---|---|---|---|
| 3,783,232 | A * | 1/1974 | Mengeringhausen | B23K 9/028 219/60 R |
| 4,176,269 | A * | 11/1979 | Merrick | B23K 9/0286 219/60 A |
| 4,356,615 | A * | 11/1982 | Dearman | B23K 37/0533 29/234 |
| 4,414,454 | A | 11/1983 | Zollinger | |
| 4,492,015 | A * | 1/1985 | Dearman | B23K 9/0286 269/43 |
| 4,545,569 | A * | 10/1985 | Schroder | G21C 19/36 901/42 |
| 4,716,836 | A | 1/1988 | Hardt | |
| 4,744,302 | A * | 5/1988 | Theurer | E01B 31/08 254/43 |
| 4,769,889 | A * | 9/1988 | Landman | F16L 23/003 29/237 |
| 5,088,184 | A * | 2/1992 | Jarabak | H01F 6/00 505/879 |
| 5,126,523 | A * | 6/1992 | Rinaldi | B23K 37/0533 219/60 R |
| 5,270,514 | A | 12/1993 | Wechselberger et al. | |
| 5,288,005 | A * | 2/1994 | Beakley | B23K 37/0531 228/49.3 |
| 5,356,067 | A * | 10/1994 | Leduc | B23K 37/0531 228/44.5 |
| 5,535,938 | A * | 7/1996 | Leduc | B23K 37/0531 228/49.3 |
| 5,894,771 | A * | 4/1999 | Braun | B23D 21/04 82/47 |
| 6,031,197 | A | 2/2000 | Larsson | |
| 6,396,020 | B1 | 5/2002 | Thelan et al. | |
| 6,515,249 | B1 | 2/2003 | Valley et al. | |
| 6,762,390 | B2 | 7/2004 | Theurer et al. | |
| 7,478,596 | B2 | 1/2009 | Theurer | |
| 8,651,393 | B2 | 2/2014 | Kral et al. | |
| 8,735,761 | B2 | 5/2014 | Theurer et al. | |
| 8,955,733 | B2 * | 2/2015 | Vanderpol | F16L 1/10 228/49.1 |
| 9,168,608 | B2 | 10/2015 | Vaia | |
| 9,358,628 | B2 | 6/2016 | Aglan | |
| 11,919,108 | B2 * | 3/2024 | Koski | B23K 37/02 |
| 2011/0233293 | A1 | 9/2011 | Kral et al. | |
| 2019/0240922 | A1 * | 8/2019 | Jansson | B29C 66/83221 |

* cited by examiner

General Apparatus Locations

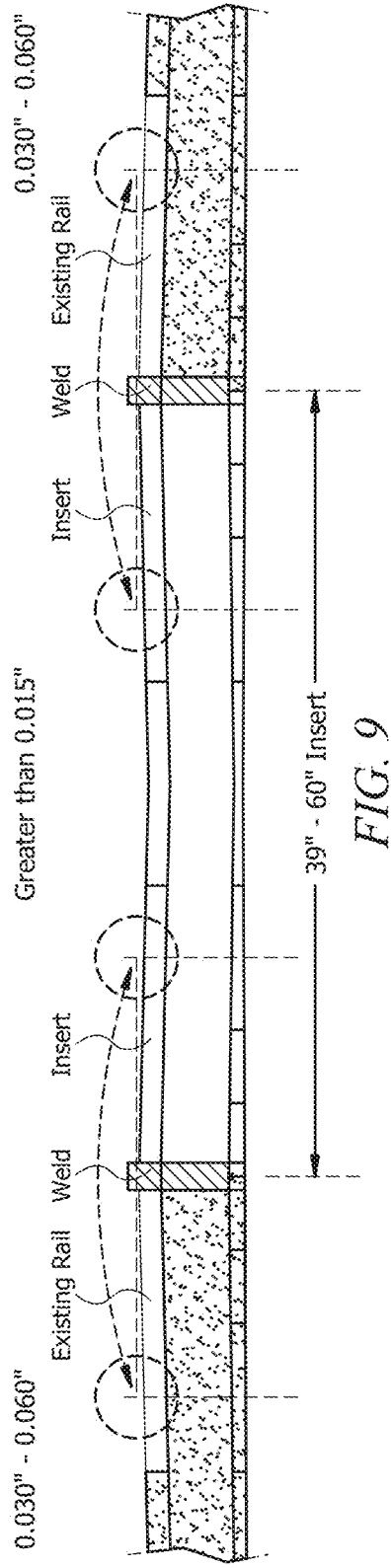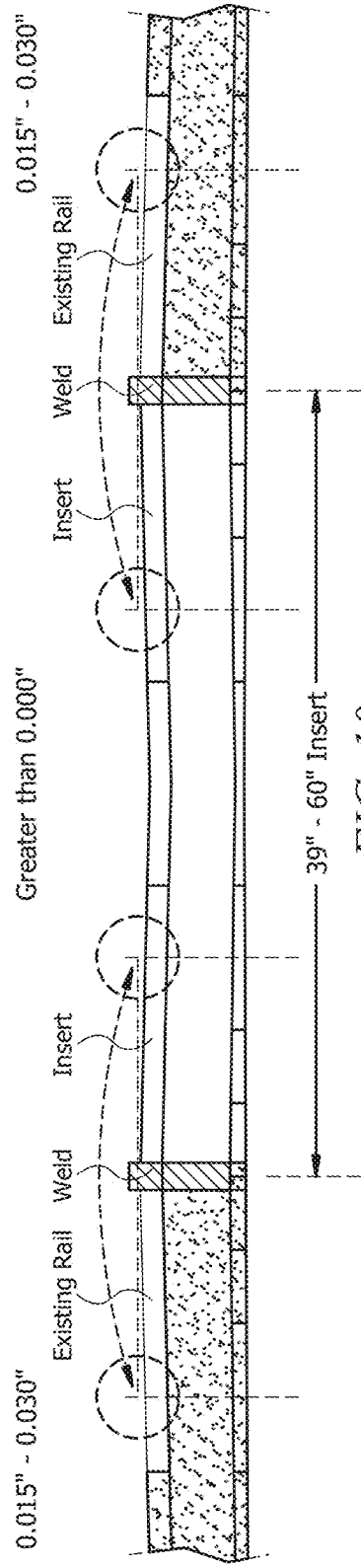

115RE AREA #1 RELAY

112RE AREA #1 RELAY

132RE AREA #1 RELAY

115RE AREA #2 RELAY

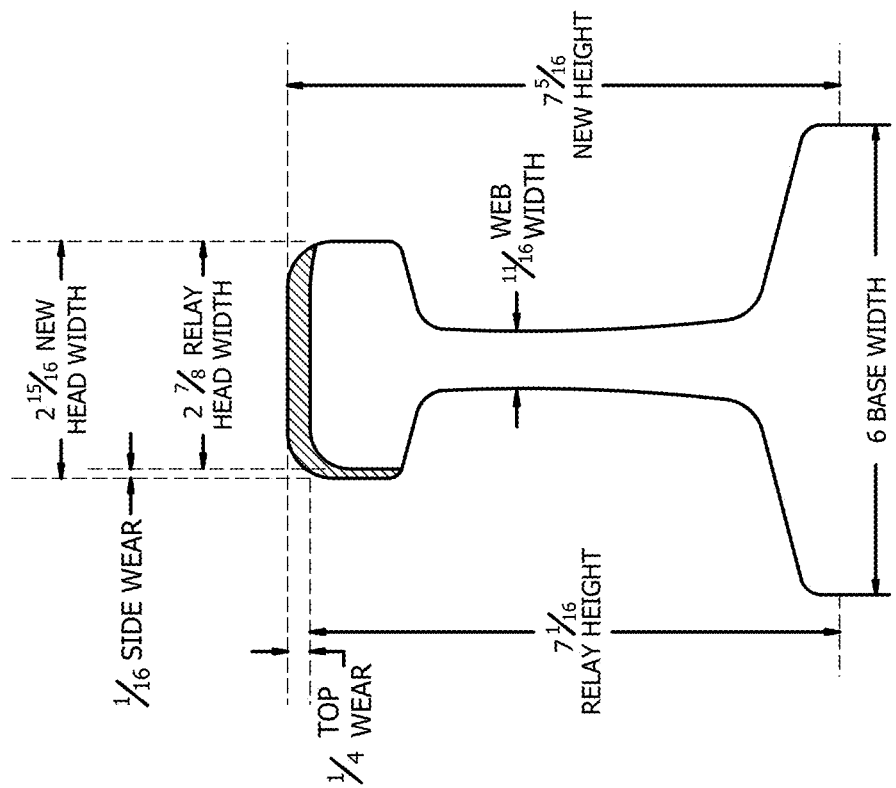
FIG. 15F  136RE AREA #2 RELAY
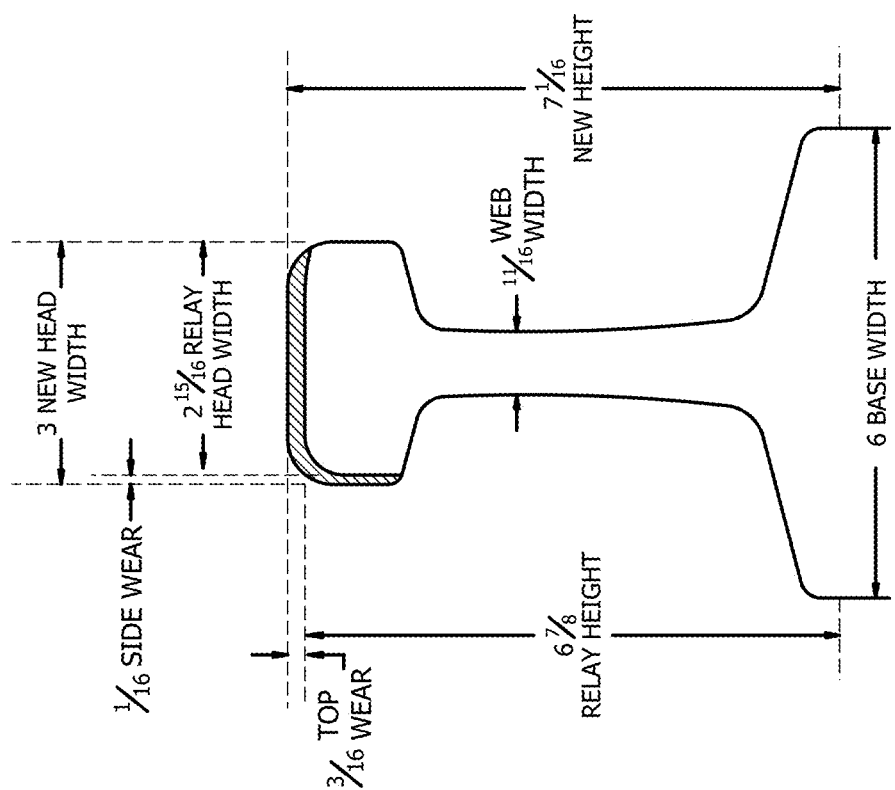
FIG. 15E  133RE AREA #1 RELAY

AUTOMATED GEOMETRY AND CROWNING APPARATUS FOR USE OF MOBILE ELECTRIC FLASH-BUTT WELDING OF RAILROAD RAILS AND RAIL INSERTS

PRIORITY

This application is a continuation of allowed U.S. Non-Provisional application Ser. No. 17/738,839 filed May 6, 2022, which claims priority to U.S. Provisional No. 63/186,108, filed May 8, 2021, the entirety of which is hereby incorporated by reference.

TECHNICAL FIELD

The present disclosure provides an automated geometry and crowning apparatus to be incorporated into a field/mobile EFB welding machine designed to adjoin two railroad rails together. Specifically, the apparatus comprises of a fixed longitudinal member incorporated within the machine and a plurality of reference points that can be adjusted by either the use of a mechanical, an electrical, or a hydraulic source of movement. The arrangement of these point allows the vertical alignment (crowning) to be consistently accomplished within the defined distance of the outer most reference points of the system, of which the rail is lifted into contact with the interior reference points by a lifting mechanism affixed between the rail ends to be welded and outer most reference points, allowing the performance of welds on short rails/inserts.

BACKGROUND

Railway rails are used to create a complex, yet efficient, network of tracks that are utilized to transport goods and people throughout the world. Tracks are comprised of two parallel running rails affixed at a specific distance, or gauge, via a wide variety of different styles of base plates available with spikes, anchors, clips, etc. to a perpendicular object such as a concrete, composite, steel or wooden tie or a direct fixation to a flooring to hold the rails in a continuous parallel arrangement, creating a running surface for which the railway wheels run on.

Railway rails have evolved over time from longitudinal lengths of 15' to 20' in length to a standard 39', 40' 78' and even 80' lengths over the years, which were then connected via joint bars, or fishplates, a set of either 4, 6 or 8 bolts, washers, and nuts. These joints in the rails, quickly became the system's weakest points, made for a rough ride and were expensive and time consuming to maintain for a railroad, specifically a freight railroad which ran a fleet of growing rail cars to haul more weight per car. They were also a safety hazard that could cause an accident or derailment, where a train would come off the tracks because of a gap in the running surface created by a broken joint.

The troublesome nature of rail joints led to one the most important advancements in railroad history, Continuous Welded Rail (CWR). CWR eliminated the joints in railroad rails by EFB welding a multitude of rails together in a Fixed Welding Plant and then installing them into the track with Thermite, Gas Pressure or EFB welds, ultimately eliminating the joints and providing a much smoother and safer railroad all together. However, CWR also now requires the maintenance of the amount of tension/compression found within the newly created long strings of rail. Heating, cutting and pulling are utilized to set rail to a Preferred Rail Laying Temperature (PRLT), allowing for the expansion/contraction of the steel, without causing the tracks to lose proper alignment.

Today CWR is also now subjected to regularly scheduled Ultrasonic Testing (UT) to find any internal defects in the rails that can cause the rail to fracture/fail when in tension, compression and/or in conjunction with the dynamic forces caused by loaded train wheels passing. This process has further reduced the amount of broken rail accidents/derailments occurring on modern railroads.

When defects are identified by the UT testing, they are logged into a tracking system and may require the removal of the specific defect immediately, 24-48 hours, or longer depending on the type of defect that is identified. When the defects are cut out, new segments of rail (plug rails) at a specified minimum length between 12' 6" and 40' are installed, depending on the segment location of the track that the rail is located (tangent, curves, etc.) and the type of defect identified. The shorter plug rail installed is then permanently welded into the CWR by means of EFB welding or a Thermite Weld.

Plug rails have additional requirements beyond length which include the grade type/metallurgy of both the existing rail and plug rail being within specifications and a tolerance of head loss compatibility to allow for a proper plug rail installation and welding requirements to be met. A typical railroad specification for plug rail metallurgy utilized today requires that a plug rail have a Brinell hardness rating of the same or greater than the existing rails in track.

Maintenance Grinding has also become a standard practice to minimize the amount of defect occurrences found in CWR. During maintenance grinding smaller defects, located near the running surface, can be removed before they have a chance to grow into a defect large enough that requires the section of rail to be replaced.

Due to these advancements in creating and maintaining CWR combined with the improvements made at the steel mills to create rails with a higher Brinell hardness value by modern railroads, welds and welding methods utilized to adjoin rails have faced increased scrutiny and have become the focus for further improvement. Thermite welds are utilized less and less, while the long standing EFB welding process has been able to not only consume less but, also to create a smaller Heat Affected Zone (HAZ) because of the weld heating process.

When EFB welds are made in the fixed plant environment, the rail ends are positioned and clamped into the most ideal position for welding by an electric over hydraulic control system for both the horizontal and vertical alignment, prior to initiating the weld process. This is relatively easy to achieve given the abundant space/access around the entirety of the rail ends. It is a consensus that this repeated near perfect geometry of the welds is a large contributor to the enhanced lifespan of a plant EFB weld versus a field/mobile EFB weld.

Mirroring a consistent and ideal geometry of a field/mobile EFB weld, that is easily repeatable, has long been a candidate for a permanent solution to add longevity and durability. Unlike a plant EFB weld, a field EFB weld must overcome weight restrictions of the EFB equipment itself and lacks the space/access around the underside of the rails to utilize the mechanical approach of the plant EFB welds.

In the field, horizontal alignment has a relatively large amount of space on either side of the rail to create a consistent alignment. This is achieved by several different approaches, depending on the manufacturer of the field/mobile EFB equipment. Some mobile EFB welding machines utilize horizontal hydraulic cylinders to properly set the horizontal alignment of the rails prior to welding. Others utilize the concept of a Central Shaft and identical jaws to always clamp the rail into the same position on the horizontal axis.

Vertical alignment of the rails is difficult because of the lack of access to the space underneath the rails to be welded. Often, the rails are pre-aligned before putting the EFB welding head into place by means of mechanical or manual hydraulic jacks. These devices are not part of the machine, and they leave a lot of the finite adjustments of the process to the person doing the welding. They are also susceptible to sagging of the rails upon placing the EFB welding head into place or settling of the rocks (ballast) that jacks are placed on prior to them lifting the rails. Some field/mobile EFB welding machines have a lifting mechanism to lift rails up prior to welding. The issue that is faced by these machines is the accuracy of the lifting distance and that they are typically part of a larger machine, not commonly utilized within North America. Vertical alignment can also be done by use of an external rail puller which has jacks built into the device. This is an ancillary to the welding head itself and used in conjunction of the welding head. Therefore, to enhance the lifespan/durability of a field/mobile EFB weld, the vertical alignment within the welding head itself is where the most room for improvement is.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 9 depicts proper initial vertical alignment (pre-weld) for insert welding on both welds required to install the insert into the existing rails in one embodiment;

FIG. 10 depicts proper final vertical alignment (post-weld) for insert welding on both welds required to install the insert into the existing rails after the welds are cooled to ambient temperature and ready for use in one embodiment;

FIG. 15A-15H depicts a potential gradation of used rails to be Ultrasonically Tested and cut into 60"-39" Inserts in one embodiment;

DETAILED DESCRIPTION

Figure 1:
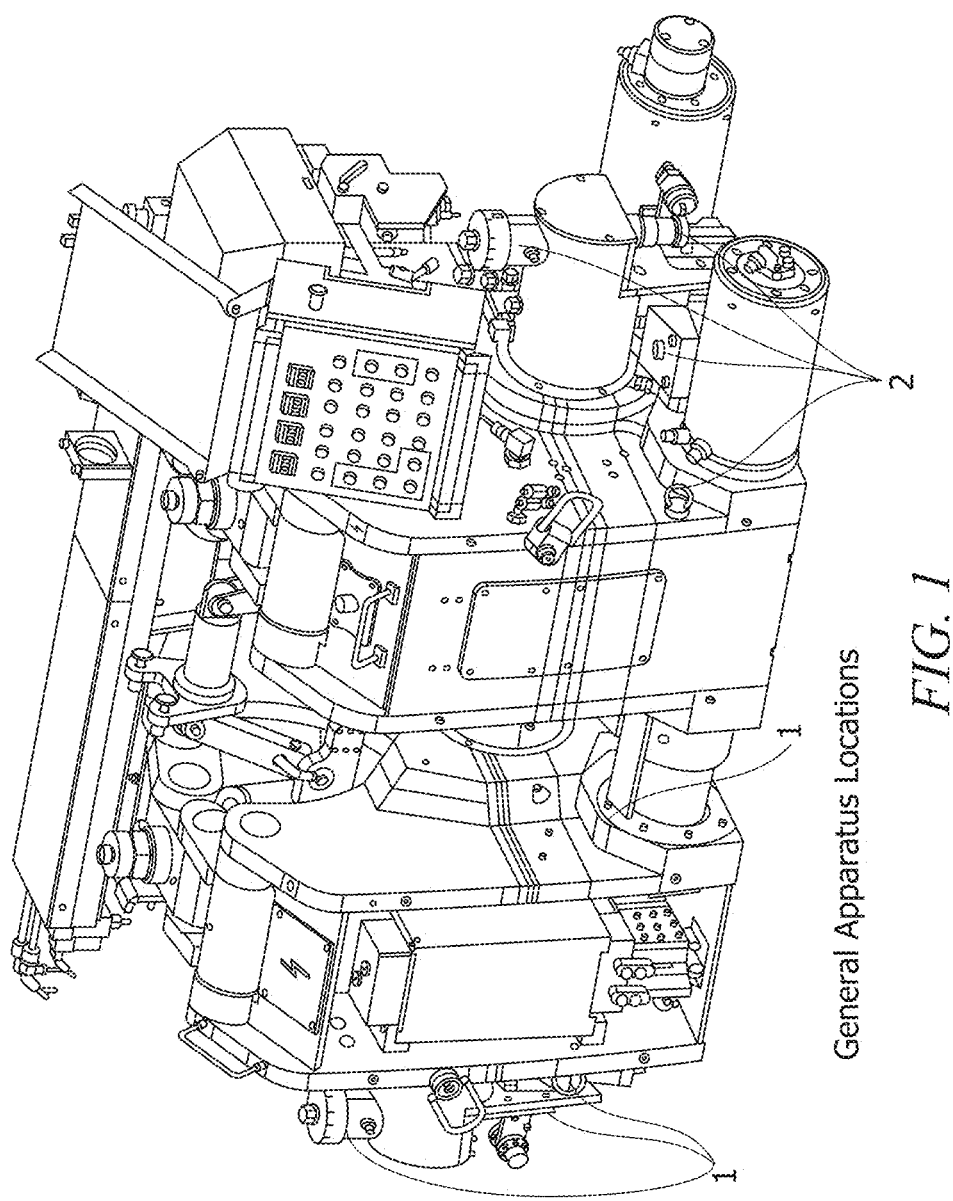
FIG. 1 depicts the Welding Head and general apparatus locations of the embodiments.
Figure 2A:
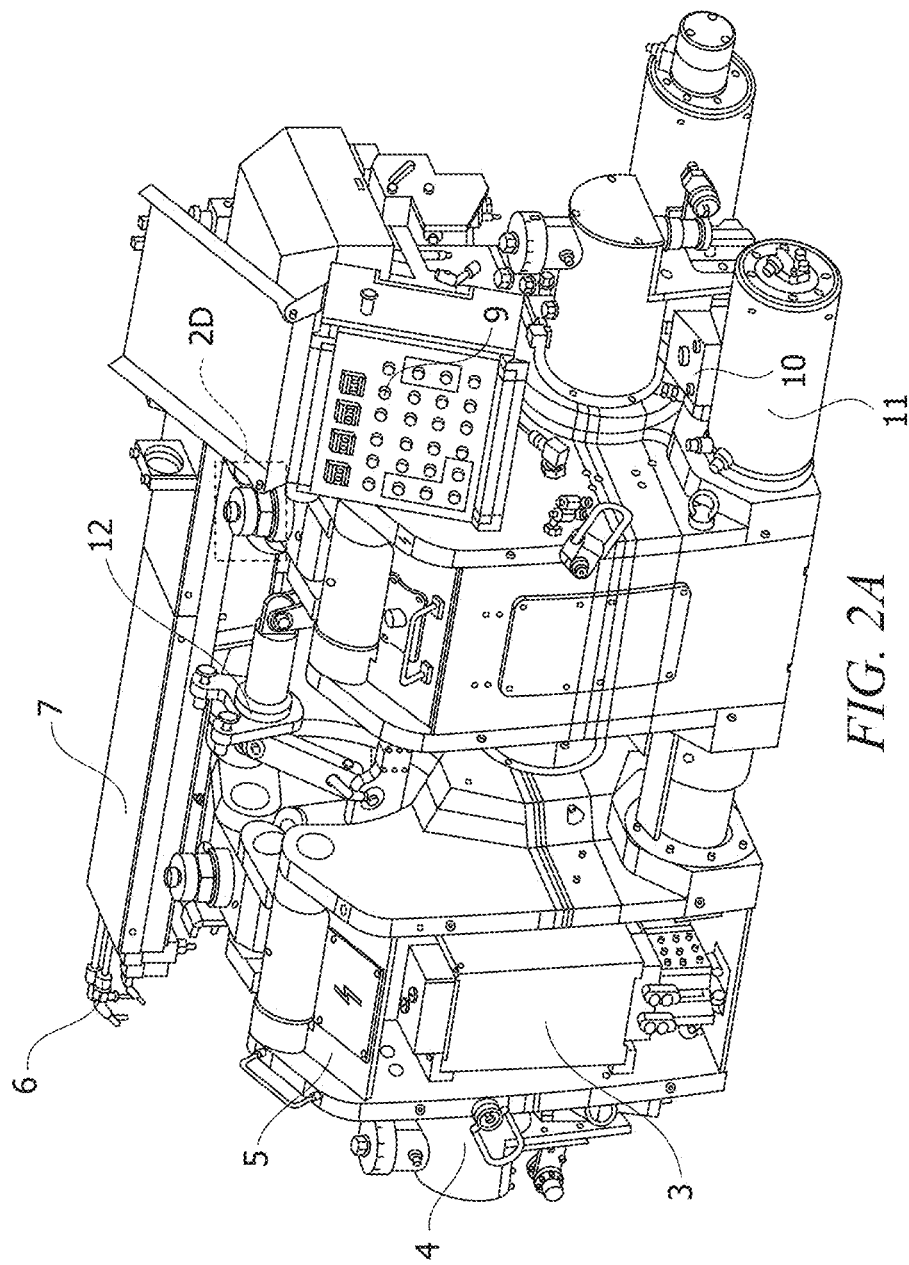
FIG. 2A depicts a perspective view of the general Welding Head apparatus in one embodiment.
Figure 2B:
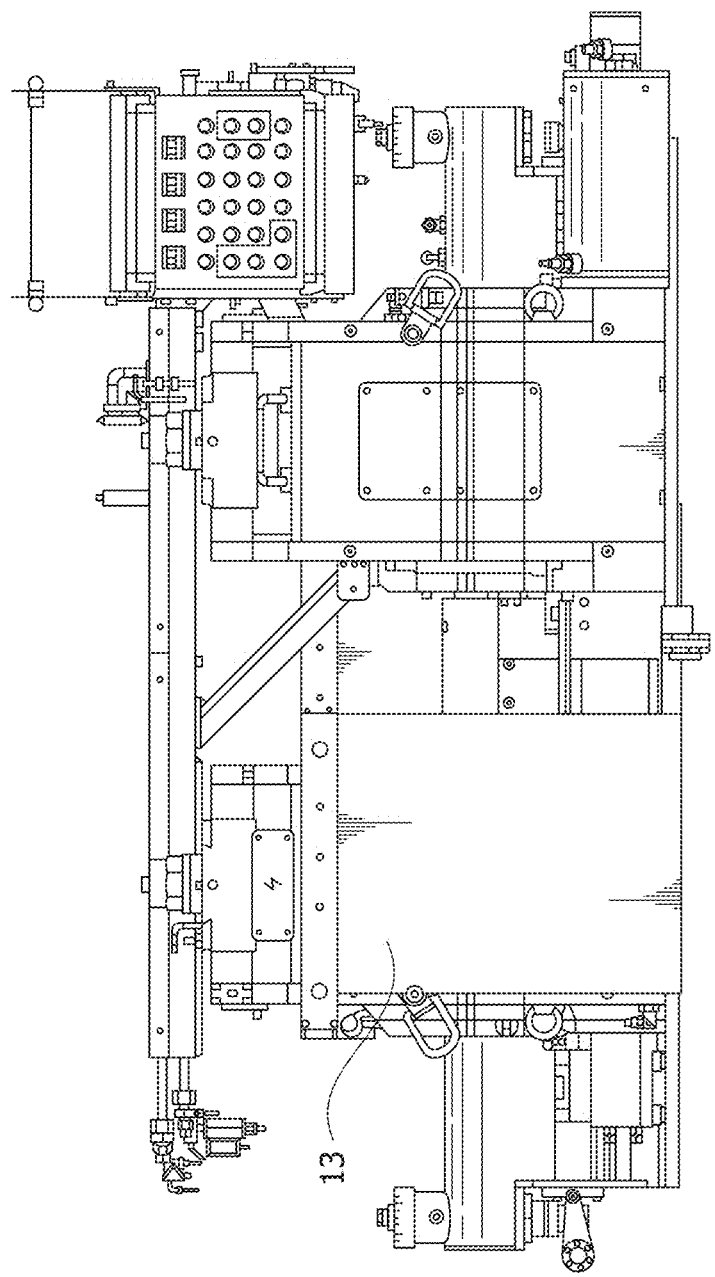
FIG. 2B depicts a front view of the general Welding Head apparatus in one embodiment.
Figure 2C:
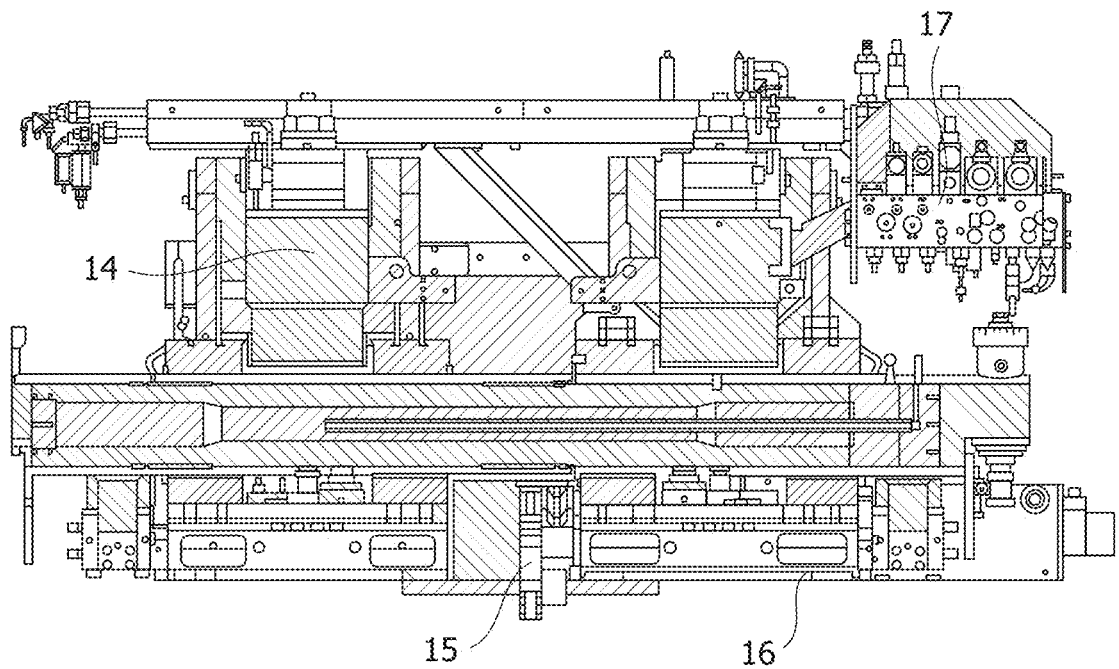
FIG. 2C depicts a rear review of the general Welding Head apparatus in one embodiment.
Figure 2D:
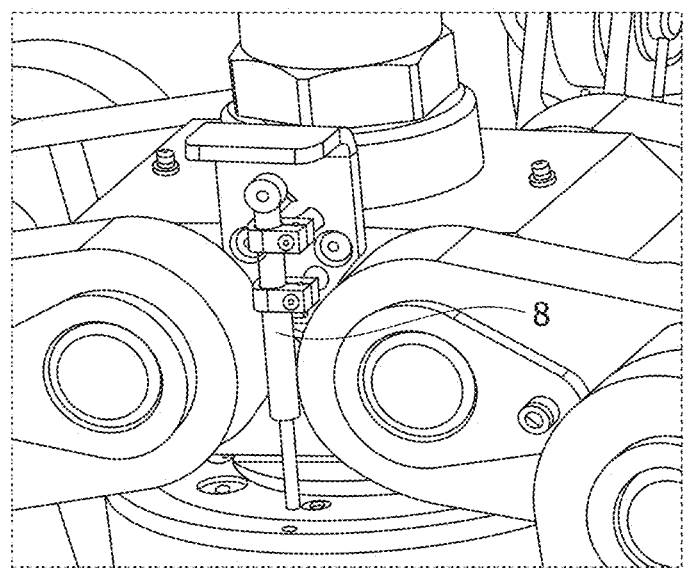
FIG. 2D is a call-out showing a better angle of the Welding Head apparatus in one embodiment.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

In one embodiment the disclosure provides an apparatus that incorporates an automated geometry system that creates field/mobile EFB welds with proper vertical alignment on new or used railroad rails and on short rail plugs/"inserts" by utilizing a fixed longitudinal member incorporated within the machine and a plurality of reference points that can be adjusted by either the use of a mechanical, an electrical, or a hydraulic source of movement. The length of the inserts is much smaller than previously allowed, as discussed below herein.

A minimum of four (4) adjustable reference points are to be orientated on the EFB welding head and utilized to create the vertical alignment which is known by the difference in distance of these reference points and creates the vertical alignment or "crown" within a defined longitudinal distance of the rail surface. In embodiments depicted, the outer most reference points create this definition by acting as the lower fulcrum/"pivot point" of the running surface of the rails to be welded. The inner most reference points define the peak position to which the rails to be properly aligned for welding of the new or used rail running surface of the rails to be welded.

In addition to the minimum of four (4) adjustable reference points, a lifting mechanism is embodied into the machine to lift the rails into the proper position. The lifting mechanism, in one embodiment, is incorporated between the outer most reference point and the end of each rail to be welded. Upon lifting, each rail's running surface is positioned into contact with the adjustable reference points that have been properly positioned by the machine operator via the mechanical, electrical, or hydraulic source of movement.

Once the rail running surface, of each rail to be welded together, is in contact with the adjustable reference points, it is held in position by the lifting mechanism. In some embodiments, the lifting mechanism maintains force on the rail until the welded head is clamped with full force onto the rails prior to welding. The addition of a sensor to detect/ensure the rail is in contact with the inner reference point can be utilized and incorporated into the welding control system, indicating that the rails are properly positioned prior to welding.

Once full clamp pressure is applied via the rail clamping cylinders, the lifting mechanism on both sides of the rail can be released from the rails. Releasing the lifting mechanism is not required by this apparatus but, is no longer required because of the force applied by the clamping cylinders is such that it will hold the rails in proper position and the rail running surface will maintain contact with the adjustable reference points throughout the entirety of the weld process.

Upon completion of the weld the hot rails will cool down and the material will therefore contract, ultimately lowering the vertical alignment of the weld. Therefore, in some embodiments the system and method disclosed herein incorporates the ability to adjust vertical alignment within a range that is far greater than the vertical alignment parameters of a finished weld.

Since the system and method disclosed herein allows the vertical alignment and horizontal alignment of the weld to be defined and controlled throughout the entire weld process within the confines of the outer most reference points incorporated within the welding head, it also creates the ability to weld shorter pieces of rail together than typical standards. A short piece of rail/"Insert" may now be welded into the existing rail with a high level of accuracy and repeatability. These short rails or "Inserts" can be utilized to repair most defects found in track by installing an "Insert" instead of a 12'6" to 40' plug rail. In some embodiments, insert length can start at 4'-5' or 48"-60" and may be cut down to as short as 39" to allow the weld to fall within the space between the railroad ties, known as a crib, while still allowing for the automated vertical alignment/crowning to be accomplished by the current disclosure. The welds landing in the cribs allows the placement of the shear die to remove the weld material extruded during the upsetting process of the weld. It also allows the base of the weld to be left unground, as it is not sitting on top of a tie plate, which would require it to be ground flush on the underside of the rail base.

The 39"-60" Inserts can be made from new rail or used rail of any rail section. Used rail to be made into inserts must be Ultrasonically tested to ensure that it is free of defects and can also be Die Penetrant Tested (DPT). Used rail inserts are viable because not all existing rail sections that are in track systems are still being manufactured today.

New rail inserts can be made from any metallurgy steel. Due to some railroad engineering specifications being based on the same Brinell hardness or greater for plug rails, it is most ideal to make the Inserts from the highest Brinell rail available. This best ensures that the Inserts can be utilized in the greatest number of locations and requires the least amount of Insert inventory to repair the current rails in track.

New rail inserts can also be milled down to better match rail that is currently in service and in need of repair. This will best ensure that the insert is within tolerance for welding in-track and also provides an Insert has not experienced any fatigue from prior usage. To expedite the process and offer additional protection to the Insert, the Insert can also contain crown on the longitudinal axis through preforming or incorporated into the profile milling/grinding process. Since the Insert is only 60"-48" long, it is also easier to deploy Inserts of varying wear within Repair Welding Gangs.

FIGS. 1-16 detail one embodiment of a Mobile Electric Flash-Butt (EFB) Welding apparatus that incorporates an automated geometry system which creates field/mobile EFB welds with proper vertical alignment, within a definable distance, on new or used railroad rails and inserts by utilizing a fixed longitudinal member incorporated within the machine and a plurality of reference points that can be adjusted by either the use of a mechanical, an electrical, or a hydraulic source of movement and a lifting mechanism situated between the outer most reference point and the rail end to be welded for each rail, allowing the performance of welds on short rails/inserts.

FIG. 1 depicts the Welding Head and general apparatus locations of the embodiments in one embodiment. This illustrates the general location of the embodiments of the disclosure on the left side of the EFB welding head (1), which positions the railroad rail on the left side of the machine properly for welding. It also illustrates the general location of the embodiments of the disclosure on the right side of the EFB welding head (2), which positions the railroad rail on the right side of the machine properly for welding.

In one embodiment the welding head welds two sections of rail at a time. Put differently, the welding head will weld a left rail side and then be re-positioned to weld a right rail side.

FIGS. 2A-D depict the general Welding Head apparatus in one embodiment. This illustrates general items which comprise of a EFB welding head such as the Transformer (3), the Central Shaft (4), the Transformer Access Panel (5), the hydraulic lines from the right side of the machine to the left side of the machine (6), the Electrical and Hydraulic Line Raceway (7), the Clamp Angle Transducer (8), the Welding Head Control Panel (9), the Lifting Mechanism which is integral to the disclosure (10), the Hydraulic Upset Cylinder (11), the Welding Head Picking Point (12), the Spark Shield (13), the Clamping Cylinder (14), the Shear Die (15), the Electrodes (16) and the Hydraulic Valve Manifold (17).

Figure 3:
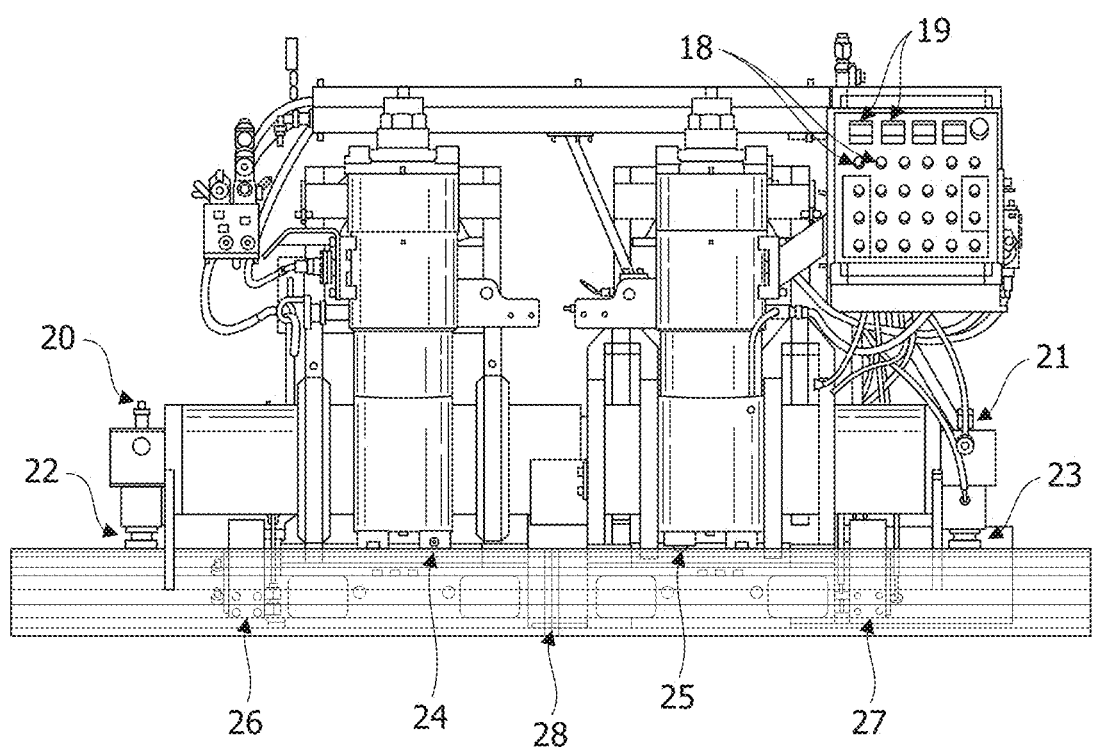
FIG. 3 depicts the vertical alignment system with hydraulic lifting and reference points in one embodiment.

FIG. 3 depicts the vertical alignment system with hydraulic lifting and hydraulically adjusted reference points in one embodiment. One embodiment will be shown with various features, but this is for illustrative purposes only and should not be deemed limiting. As shown, FIG. 3 depicts a position indicator for the left and right rails (18) and the displacement display panels (19) of the hydraulically adjusted external reference points, which create a fulcrum for the defined distance aspect of the vertical alignment of this disclosure. It further identifies the linear transducer for the left side of the welding head (20) and the right side of the welding head (21), which provide the information to the control system to be shown on the display panels (18). The hydraulically adjusted outer most reference points are shown on the left side of the welding head (22) and the right side of the welding head (23), along with the inner most reference points required to create the system on the left side (24) and on the right side (25). To ensure contact with the four adjustable reference points shown in this figure, the lifting mechanism on the left side (26) lifts the left rail into contact with the adjustable reference points on the left side of the welding head (22) and (24) and the lifting mechanism on the right side (27) lifts the right rail into contact with the adjustable reference points on the right side of the welding head (23) and (25). Upon completion of the lifting mechanism cycle, in some embodiments, the clamping cylinder (14) will apply full pressure and hold the rails in the proper position to weld the rail ends aligned at the welding line (28).

Figure 4:
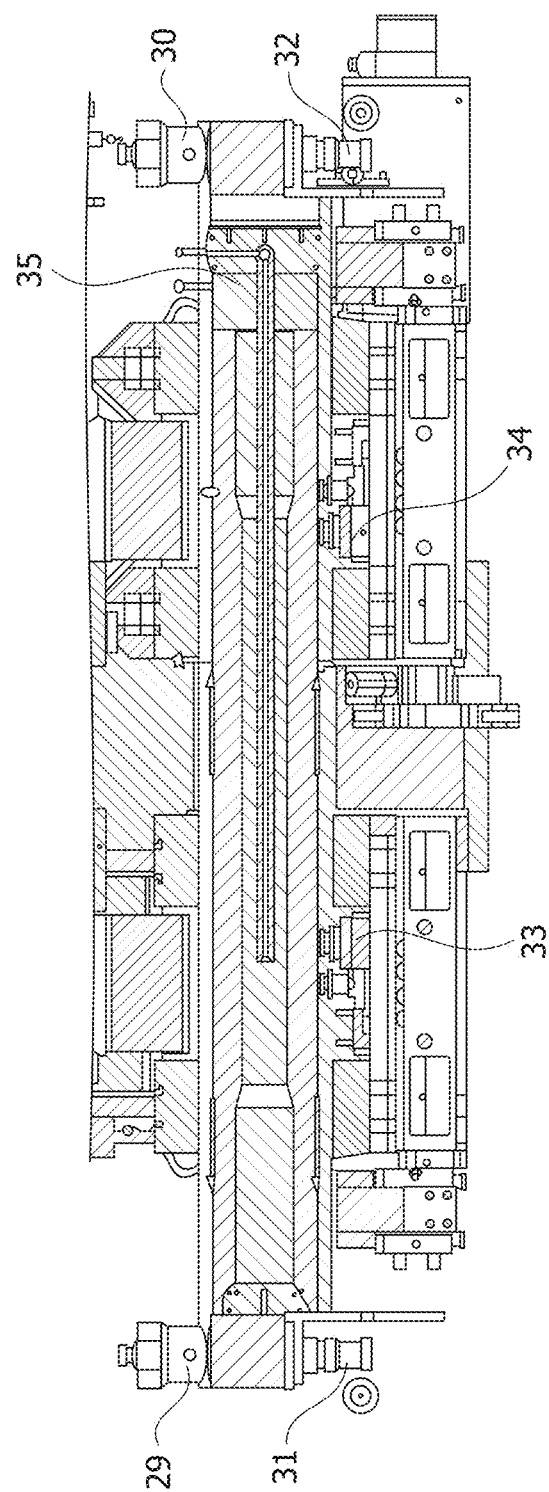
FIG. 4 depicts the vertical alignment system with hydraulic lifting and mechanical reference points in one embodiment.

While FIG. 3 shows an embodiment wherein at least some of the adjustable reference points are hydraulically adjusted, in other embodiments the reference points are adjusted via other avenues, such as mechanical or electrical methods. As an example, FIG. 4 depicts the vertical alignment system with Hydraulic lifting and mechanical reference points in one embodiment. Utilizing the mechanically adjusted system, in one embodiment, the positional sensors for the right and left side remain on the welding head control panel as shown in FIG. 3 (18), however the displacement display panels for the right and left side, FIG. 3 (19), and the linear transducer on the left side, FIG. 3 (20), and on the right side, FIG. 3 (21), are no longer needed. They are replaced in the mechanical system option with a mechanically adjusted turn dial on the left side (29) and on the right side (30). The automated vertical alignment system function is now adjusted by mechanically turning the turn dial on the left side (29) to adjust the outer most reference point on the left side (31) and by mechanically turning the turn dial on the right side (30) to adjust the outer most reference point on the right side (32). The inner most reference points on the left side (33) and on the right side (34) are also adjusted mechanically by utilizing a recessed hex head located in the center of these mechanically adjusted inner most adjustable reference points.

In one embodiment, the adjustable vertical reference points are all integrated into the welding head Central Shaft (35). In one embodiment, the Central Shaft is increased by approximately 30% in diameter when compared to predecessor welding heads of similar designs. As an example, in one embodiment the Central Shaft (35) has a diameter of about 8 inches. This greatly increases rigidity and accuracy of the automated vertical crowning and adds durability to the welding head itself. Using an enlarged Central Shaft (35) offers the ability to sustain the increased forces required to crown a comparatively smaller insert. Because of leverage, smaller forces are required to crown a longer insert. Accordingly, it is more difficult to crown a smaller insert. Having a larger shaft provides increased rigidity and structure to sustain the comparatively greater forces required to crown a smaller insert. This was not previously possible.

Additionally, in one embodiment the central shaft extends beyond the quadrant. In one embodiment the central shaft extends by approximately 10-15". In one embodiment it extends about 14". This was not possible in the prior art which terminated at or very slightly beyond the quadrants.

In one embodiment, the lifting mechanism on the left side, FIG. 3 (26), and on the right side, FIG. 3 (27) remain hydraulically operated and unchanged in the mechanically adjusted version of this disclosure. The lifting mechanisms, while described as being hydraulically operated, can comprise any system which provides the necessary force.

While FIG. 3 has discussed hydraulically adjustable reference points, and FIG. 4 depicts mechanically adjustable reference points, in some embodiments there are combinations of both. For example, the inner most reference points can be mechanical and the outermost comprise hydraulic power. In still other embodiments, one or more adjustable reference points will be adjusted electrically. Thus, the specific combinations shown in the figures are for illustrative purposes only and should not be deemed limiting.

Figure 5:
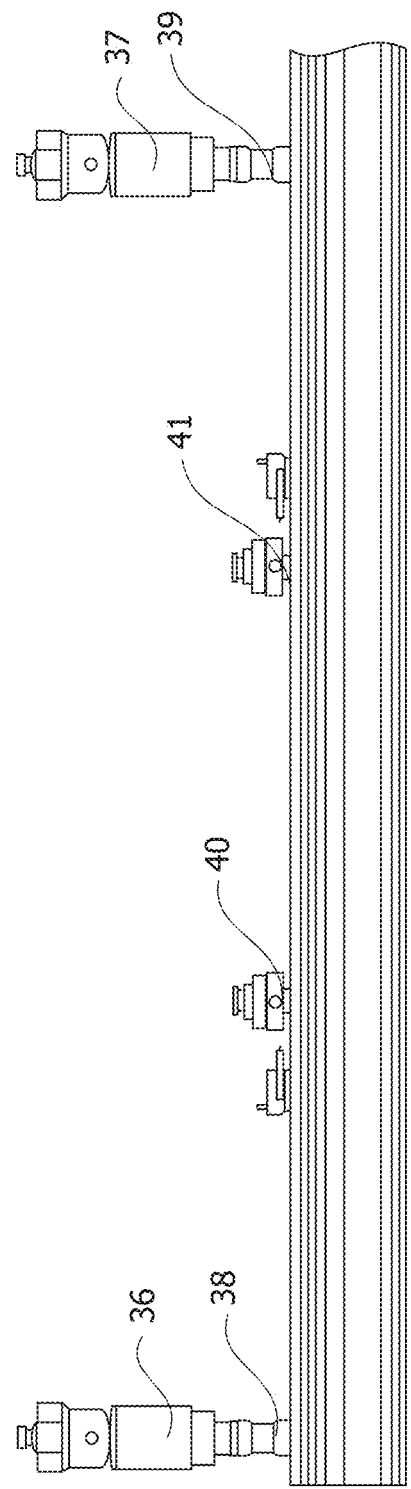
FIG. 5 depicts the minimum quantity of reference points required to complete the mechanically adjusted vertical alignment system in one embodiment.

FIG. 5 depicts the minimum quantity of reference points required to complete the mechanically adjusted vertical alignment system in one embodiment. This Figure removes all other elements of the welding head to focus on the adjustable vertical reference point embodiments of the disclosure. The turn dial on the left side (36) is the same as the turn dial depicted in FIG. 4 (29) and the turn dial on the right side (37) is the same as the turn dial depicted in FIG. 4 (30). The left turn dial (36) adjusts the left outer most reference point (38), which is the same as the outer most reference point depicted in FIG. 4 (31) and in FIG. 3 (22). The right turn dial (37) adjusts the right outer most reference point (39), which is the same as the outer most reference point depicted in FIG. 4 (32) and in FIG. 3 (23). The inner most reference point on the left side (40) is again adjusted mechanically with a recessed hex head as depicted in FIG. 4 (33) and the inner most reference point on the right side (41) is again adjusted mechanically with a recessed hex head as depicted in FIG. 4 (34).

Figure 6:
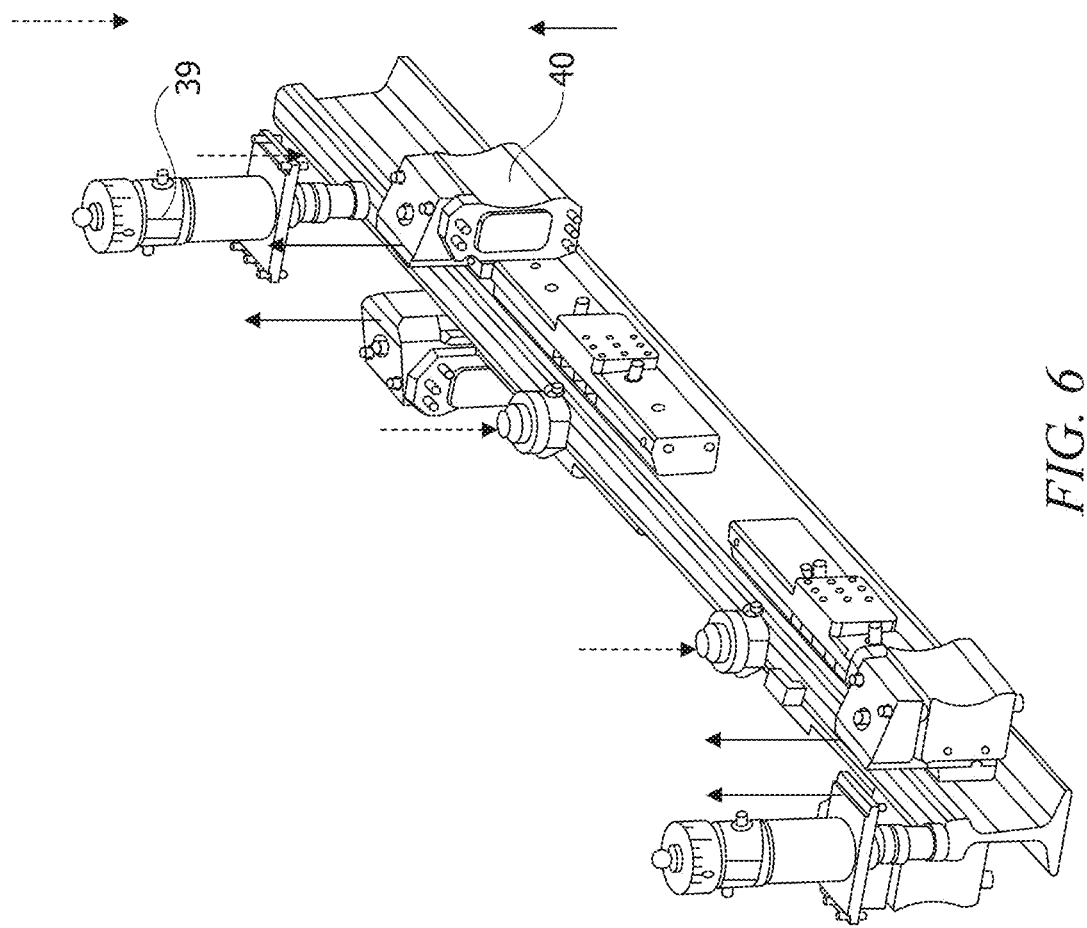
FIG. 6 depicts the vertical crowning system on pieces of rail in 3 dimensions in one embodiment.

FIG. 6 depicts the vertical crowning system on pieces of rail in 3 dimensions in one embodiment. It depicts the outer most adjustable reference points on the left and on the right side of the welding and it depicts the inner most adjustable reference points on the left and on the right, collectively (39) along with the direction of force/restraint that they input into the automated vertical alignment/crowning system. It also depicts the lifting mechanisms on the left and on the right, collectively (40) along with the direction of force/restraint that they input into the automated vertical alignment/crowning system. It is the positioning of these opposing forces/restraints and their orientation that allows them to collectively create a vertical alignment/crowning system, within the defined distance of the two outer most adjustable reference points, which allows accurate and repeatable results. The opposing vertical forces depicted in FIG. 6 and the fact that they all take place within the distance between the outer most adjustable reference points on the left and right sides, allows this system to also perform proper vertical alignment of rails to be welded on any rail that is longer than the distance from the weld line to 1" past the outer most adjustable reference point, which is +/–39".

As noted, there are four points of adjustable contact. The outer most adjustable reference points act as a fulcrum. The inner most adjustable reference points work together to create the desired crown. The lifting mechanism assumes proper contact with each adjustable reference point. This assures that whatever crown is set by the geometry of the reference points is achieved by the lifting mechanism and properly held until the welding has been completed. As noted, this is what allows comparatively shorter lengths of inserts to be utilized. Being able to control and define a set crown, even with smaller inserts, is a huge competitive advantage not previously attained.

Figure 7:
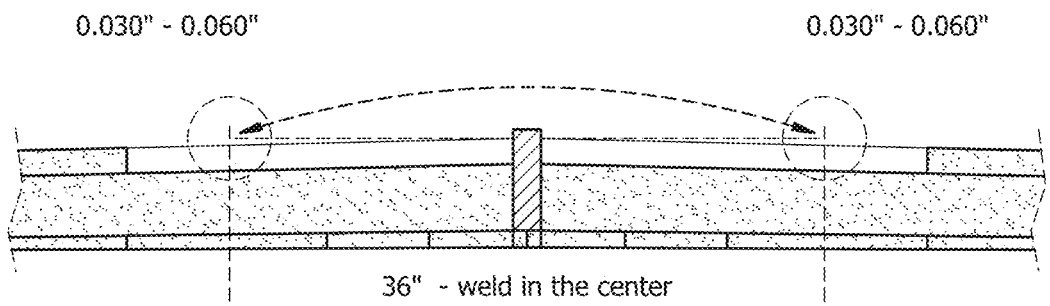
FIG. 7 depicts proper initial vertical weld alignment (pre-weld) created by the system before the weld is completed in one embodiment.

FIG. 7 depicts proper initial vertical weld alignment (pre-weld) created by the system before the weld is completed in one embodiment. These measurements are utilized because of the method of measuring a weld and they consider the cooling of the weld, which reduces the crown. When measured with a straight edge a typical pre-crown specification is 0.060"-0.120". Those measurements are taken with the 36" straight edge centered and held down on one side of the weld, thus the reason for the typical crown from a horizontal line is shown to be half of those values.

Figure 8:
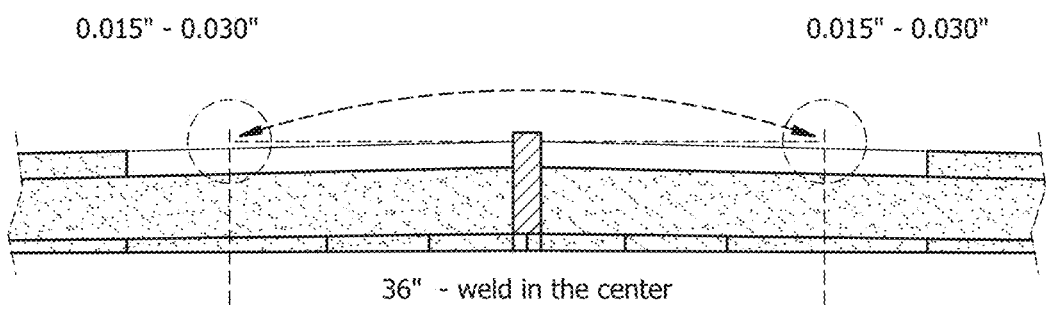
FIG. 8 depicts proper final vertical weld alignment (post-weld) created by the system after the weld is made, cooled to ambient temperature and ready for use in one embodiment.
Figure 11B:
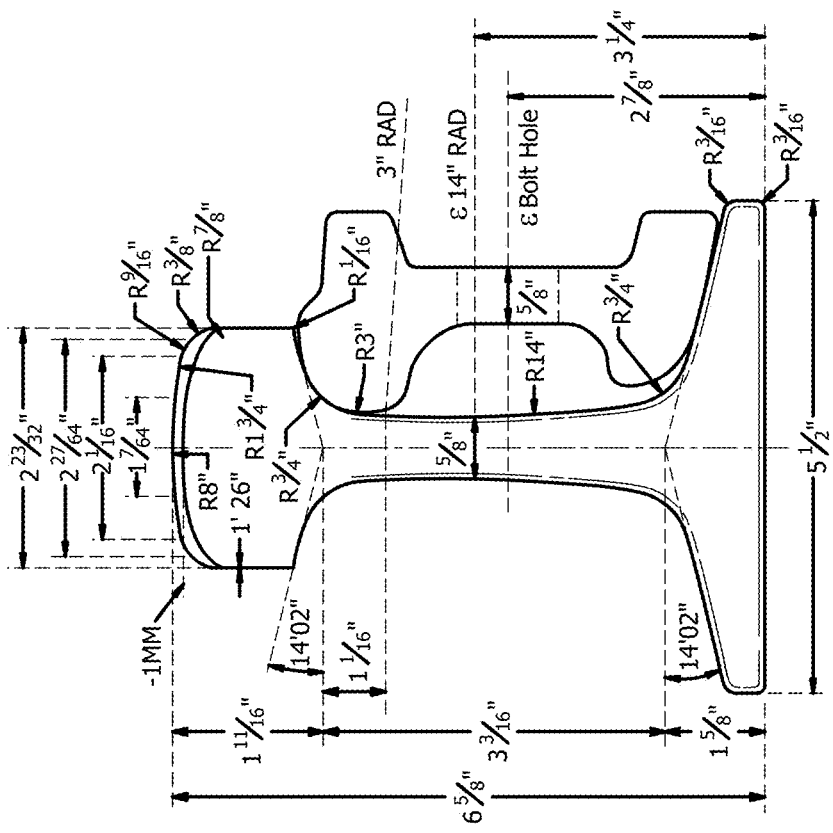
FIG. 11A-11F depicts a standard 115 lbs/yard rail section and 5 different cross sectional wear patterns ranging from 1-5 MM of head loss in one embodiment.
Figure 11A:
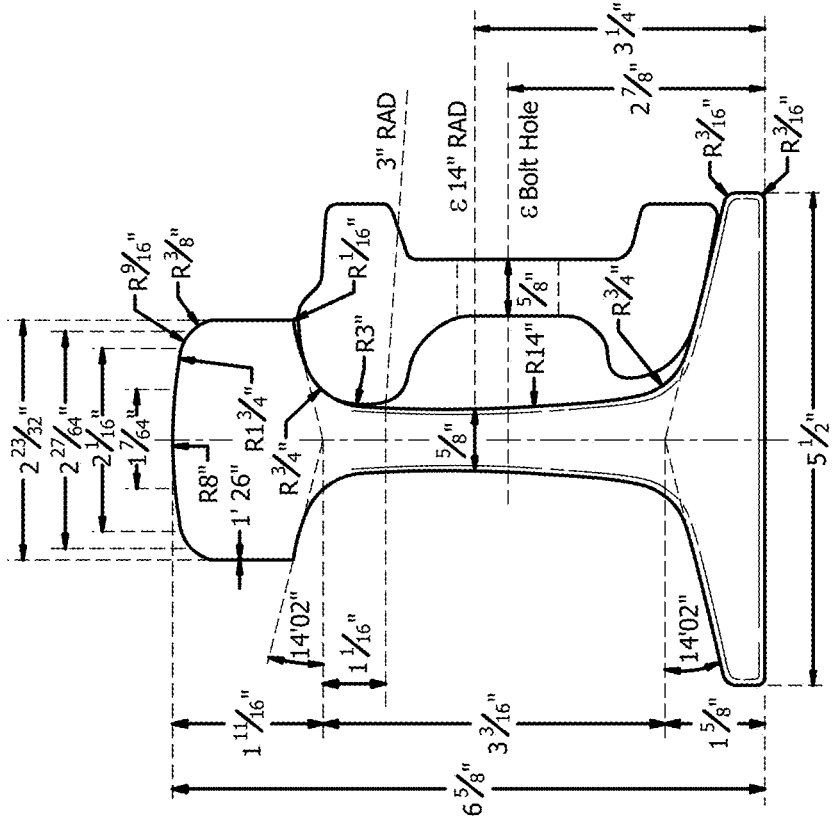
Figure 11D:
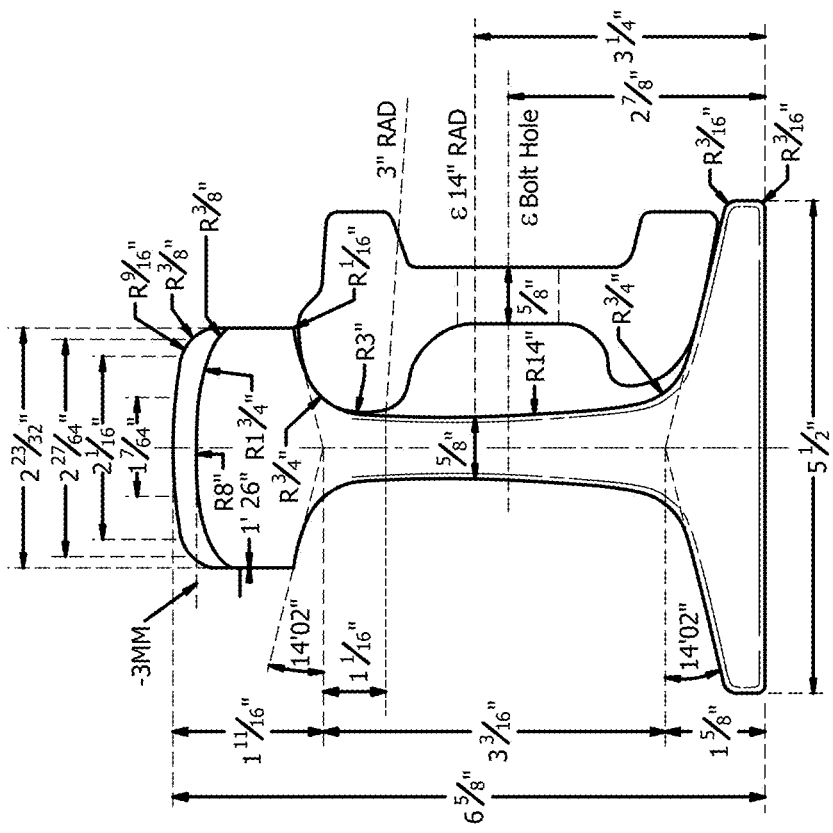
Figure 11C:
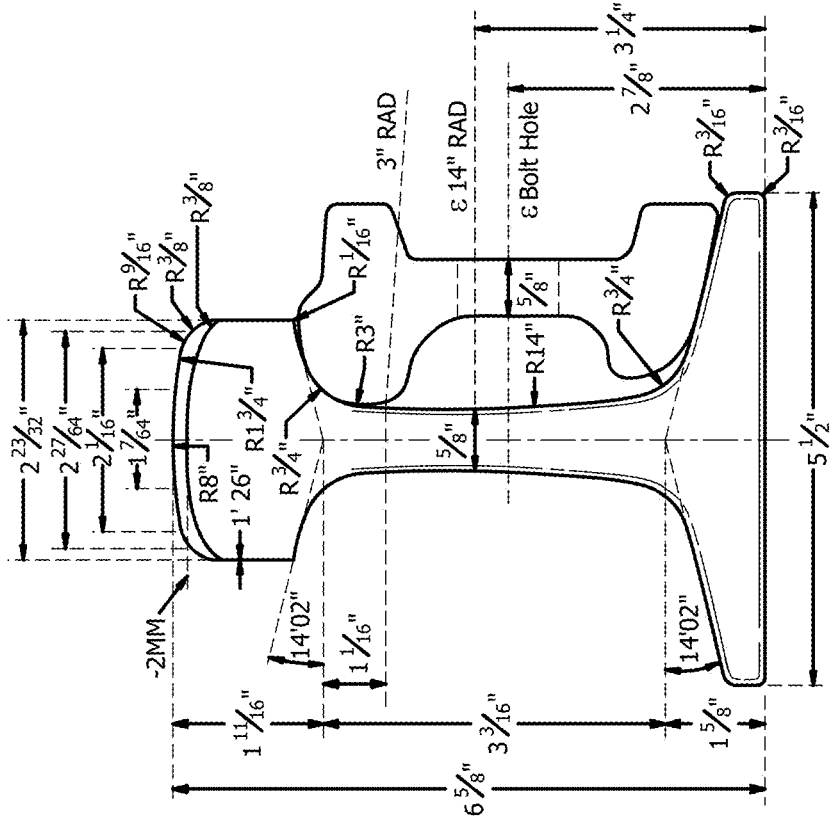
Figure 11F:
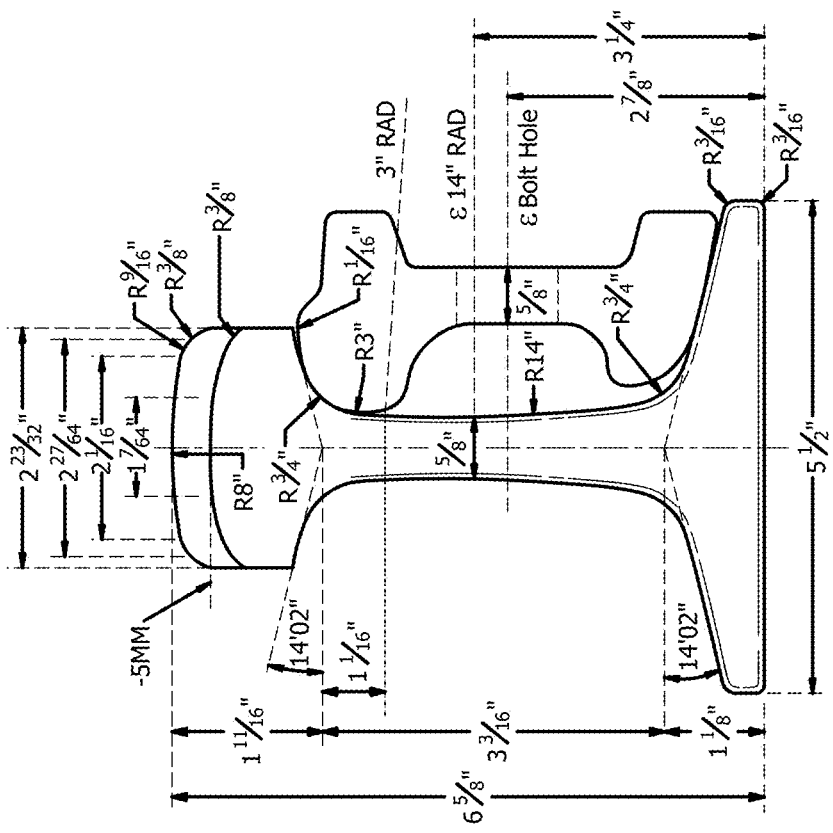
Figure 11E:
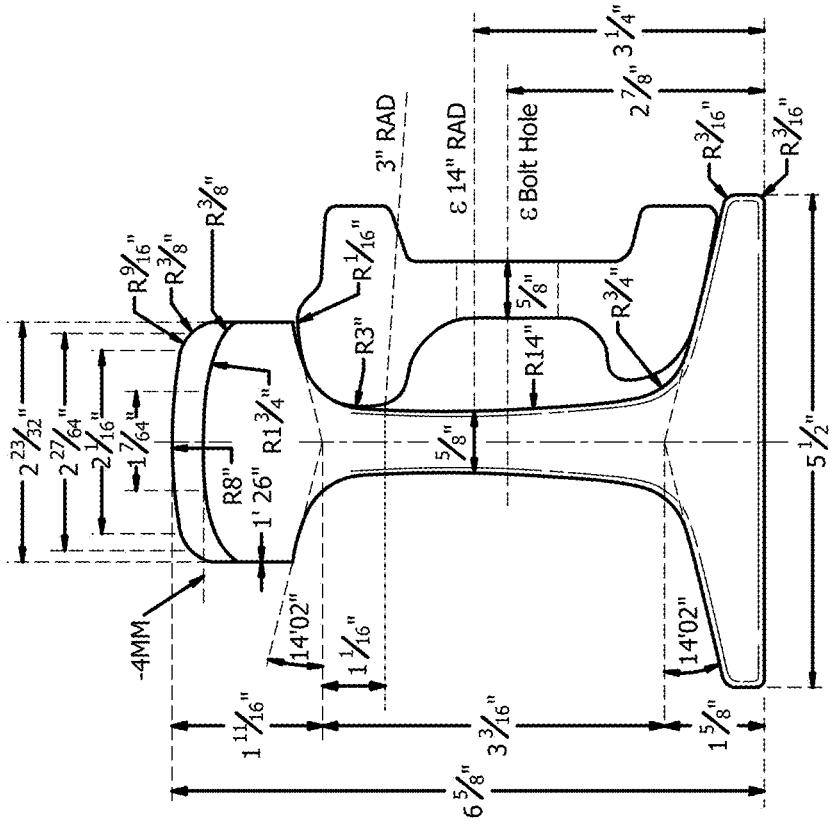
Figure 12B:
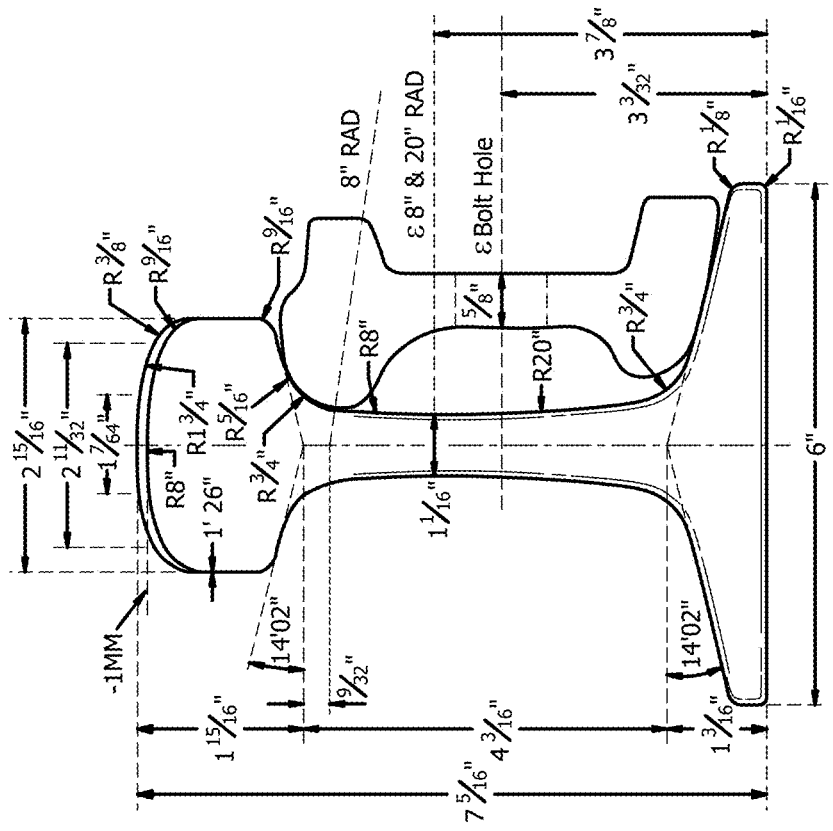
FIG. 12A-12F depicts a standard 115 lbs/yard rail section and 5 different cross sectional wear patterns ranging from 1-5 MM of head loss and incorporates a corresponding gauge face loss in one embodiment.
Figure 12A:
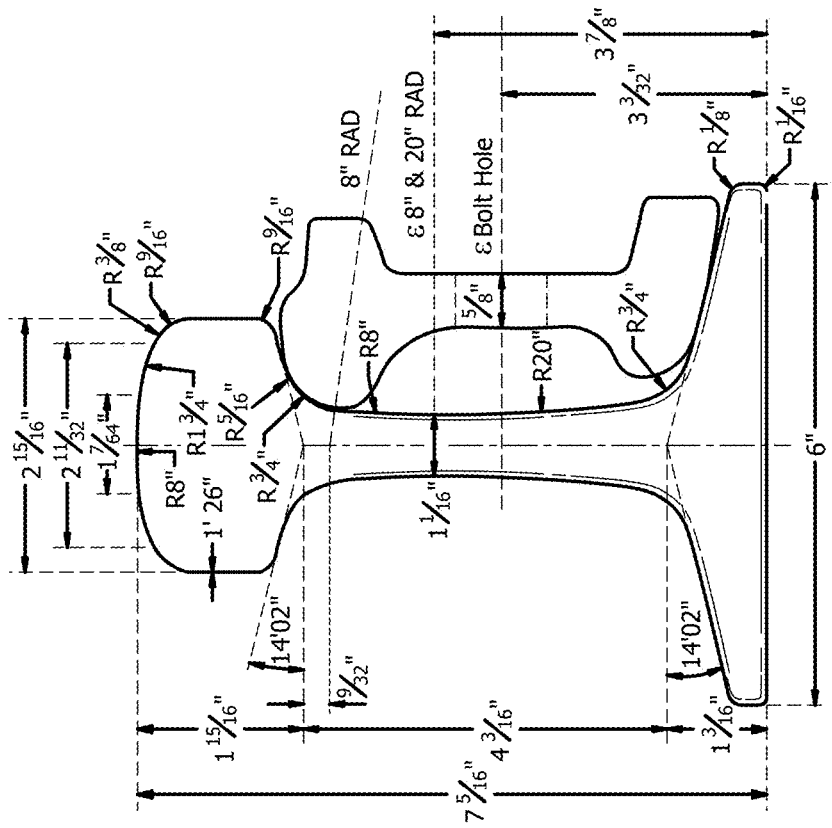
Figure 12C:
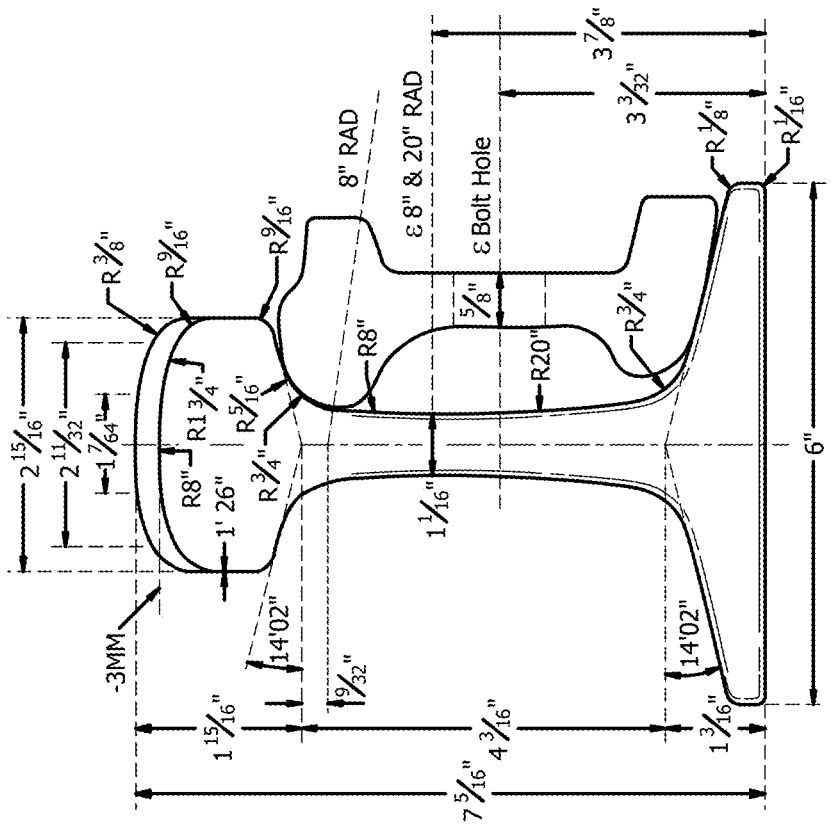
Figure 12D:
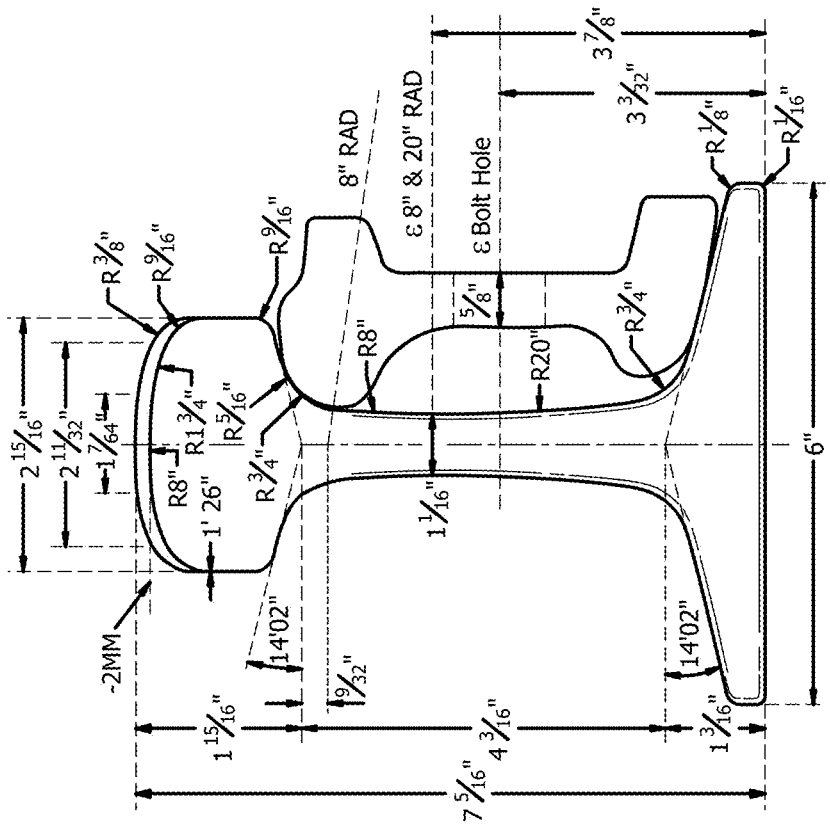
Figure 12F:
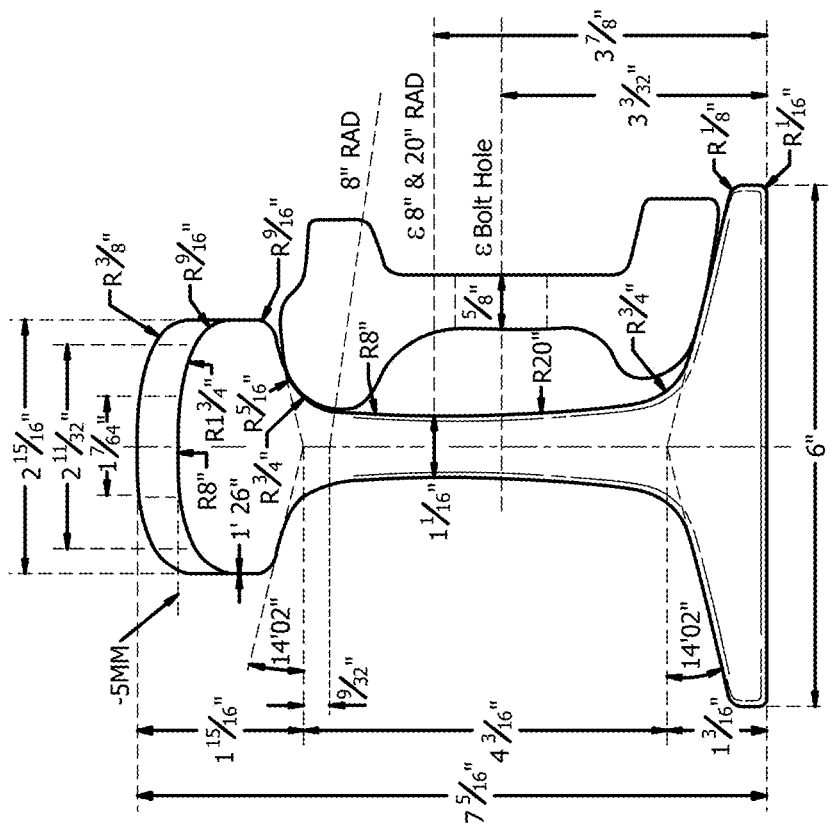
Figure 12E:
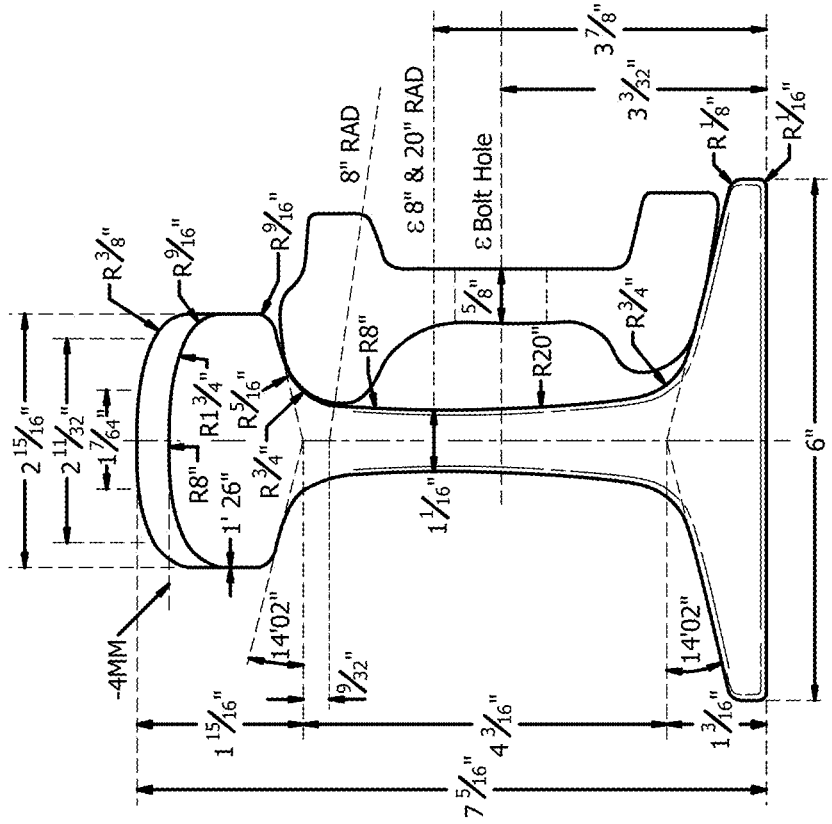
Figures 13A, 13B:
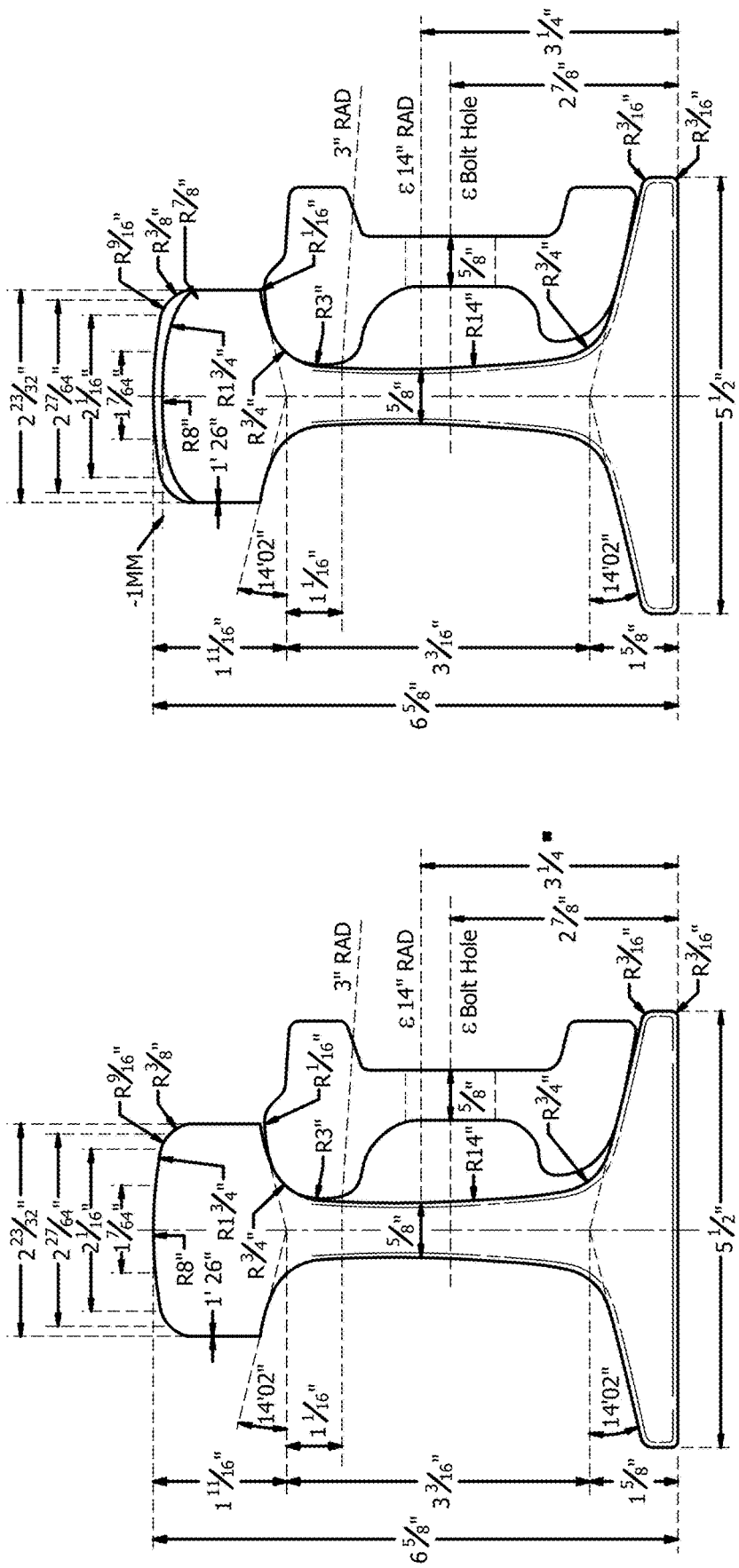
FIG. 13A-13F depicts a standard 136 lbs/yard rail section and 5 different cross sectional wear patterns ranging from 1-5 MM of head loss in one embodiment.
Figure 13C:
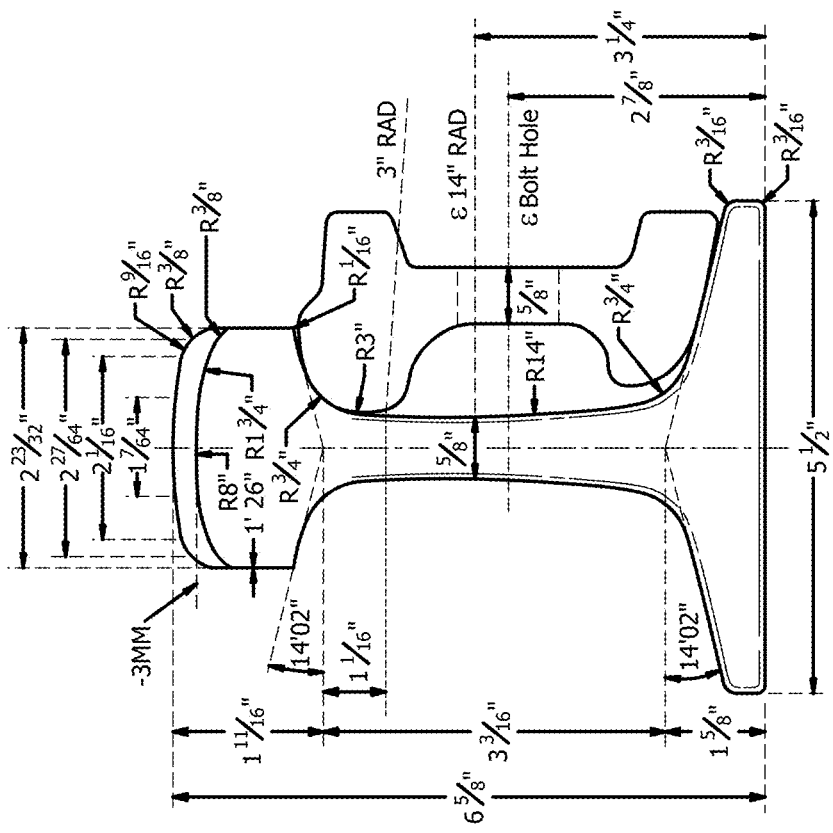
Figure 13D:
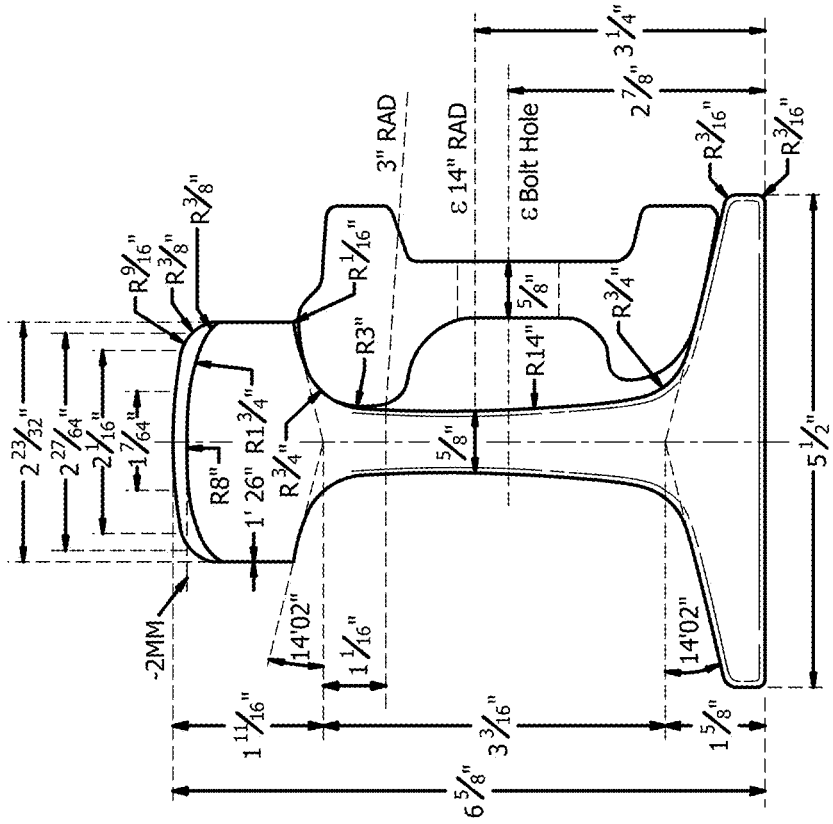
Figure 13E:
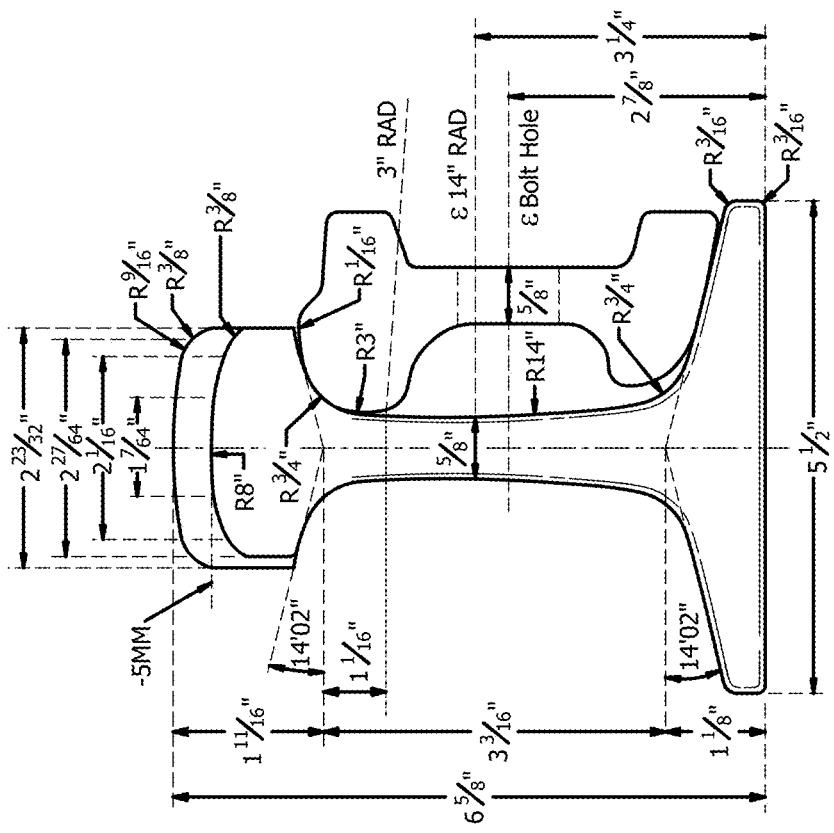
Figure 13F:
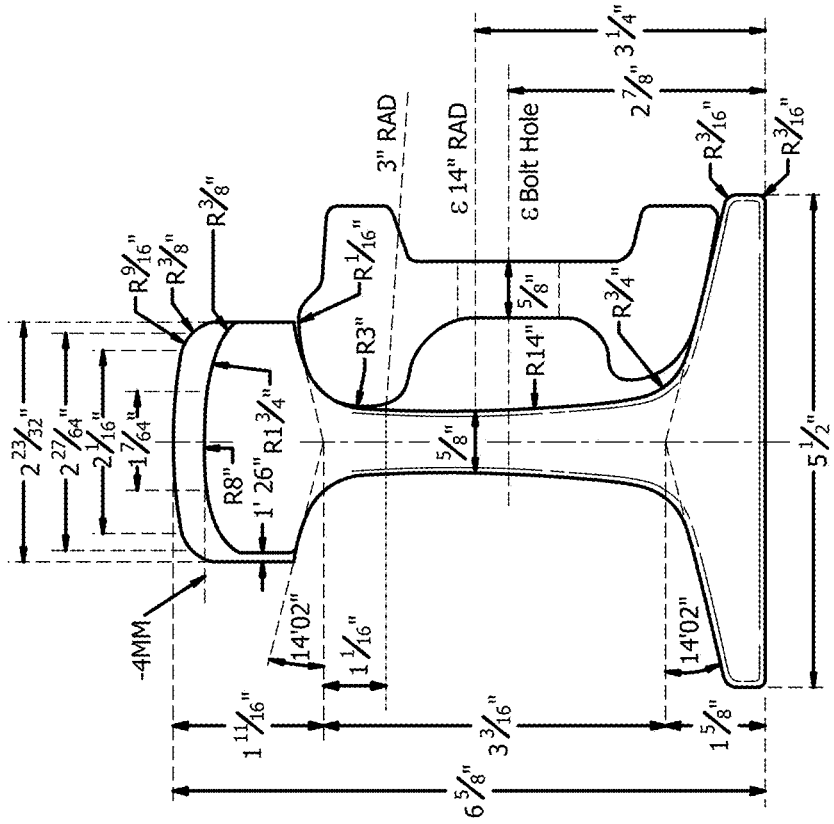
Figure 14A:
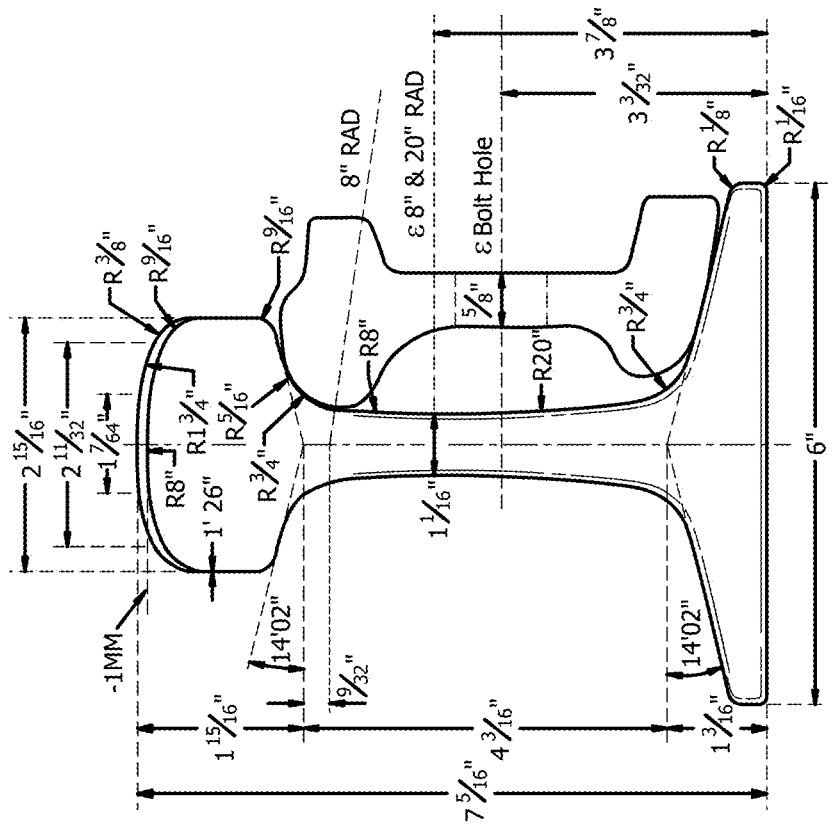
FIG. 14A-14F depicts a standard 136 lbs/yard rail section and 5 different cross sectional wear patterns ranging from 1-5 MM of head loss and incorporates a corresponding gauge face loss in one embodiment.
Figure 14B:
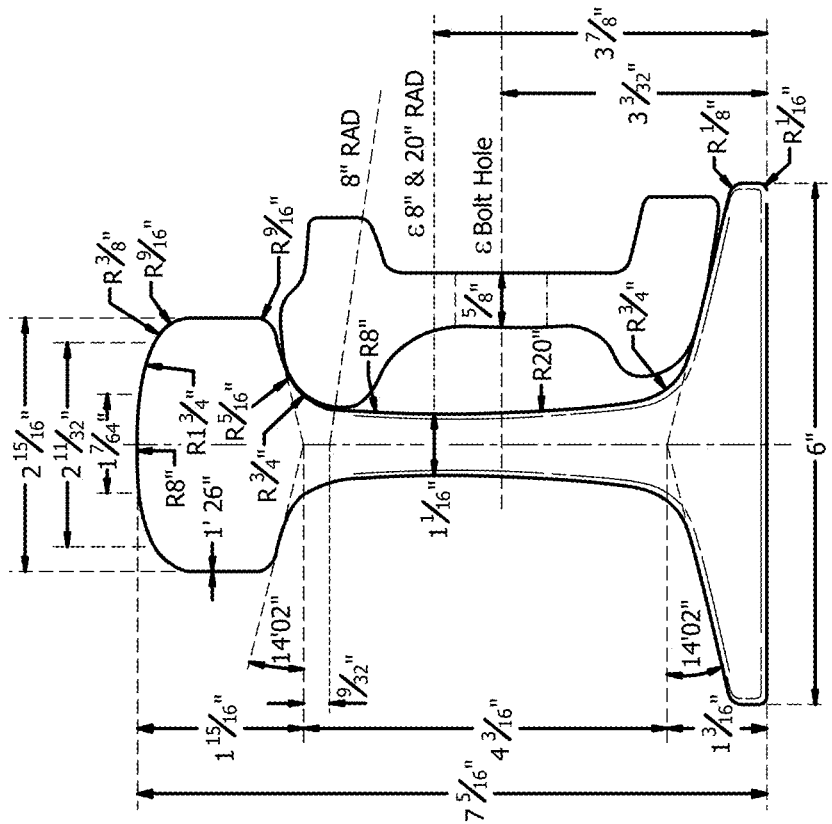
Figure 14C:
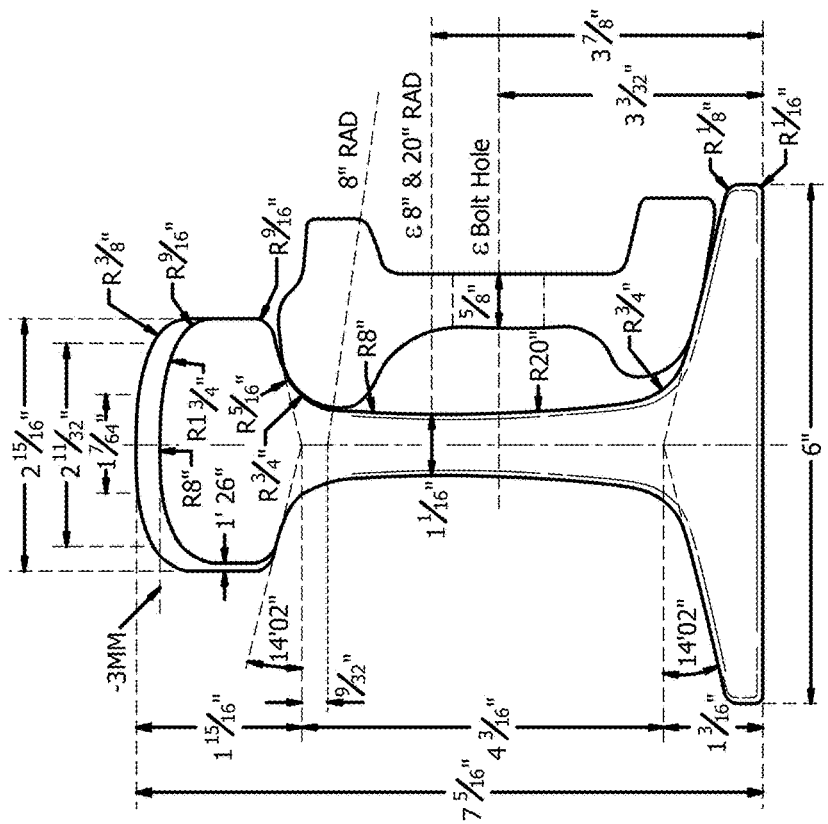
Figure 14D:
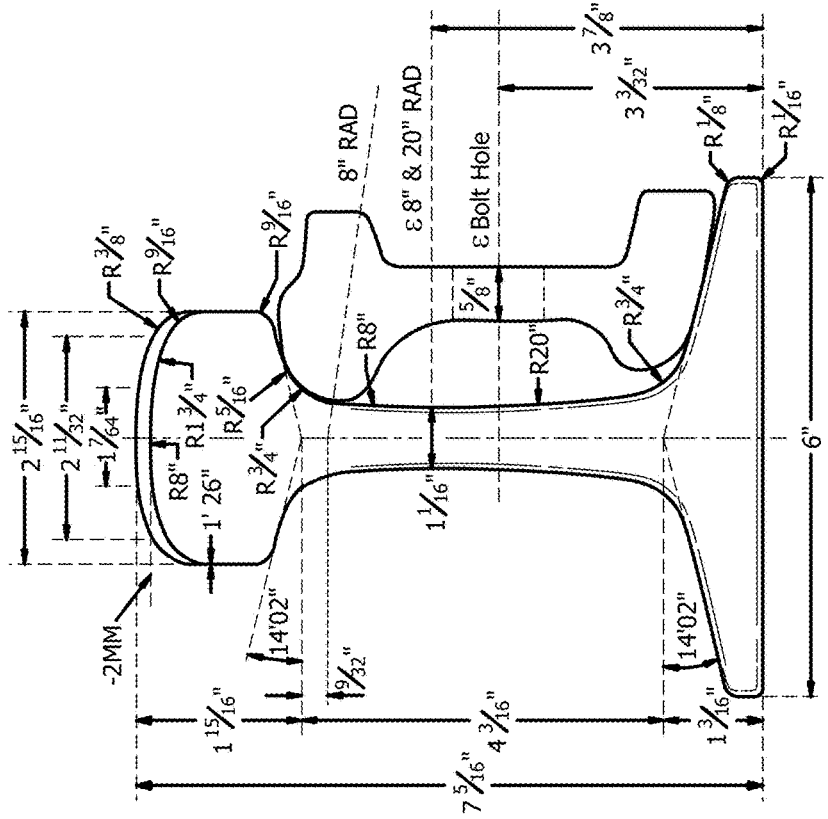
Figure 14F:
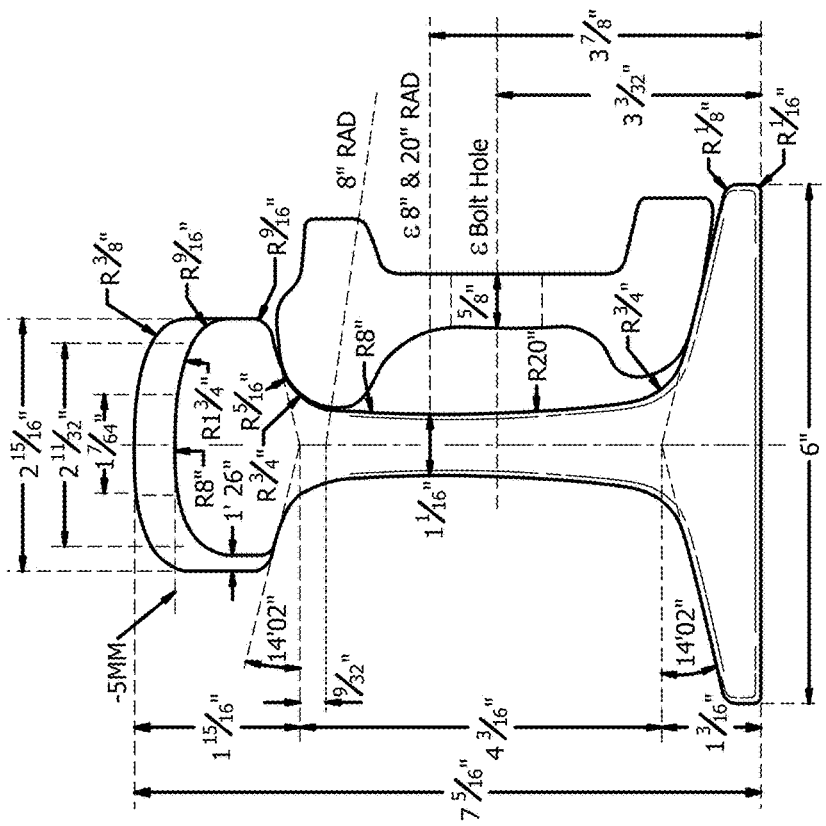
Figure 14E:
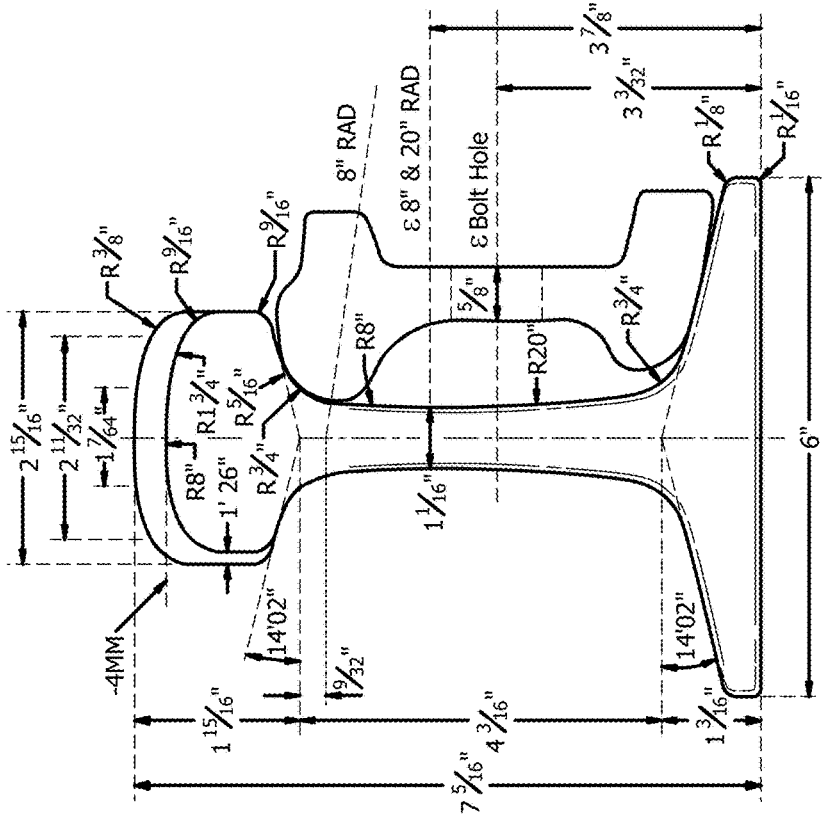
Figure 15B:
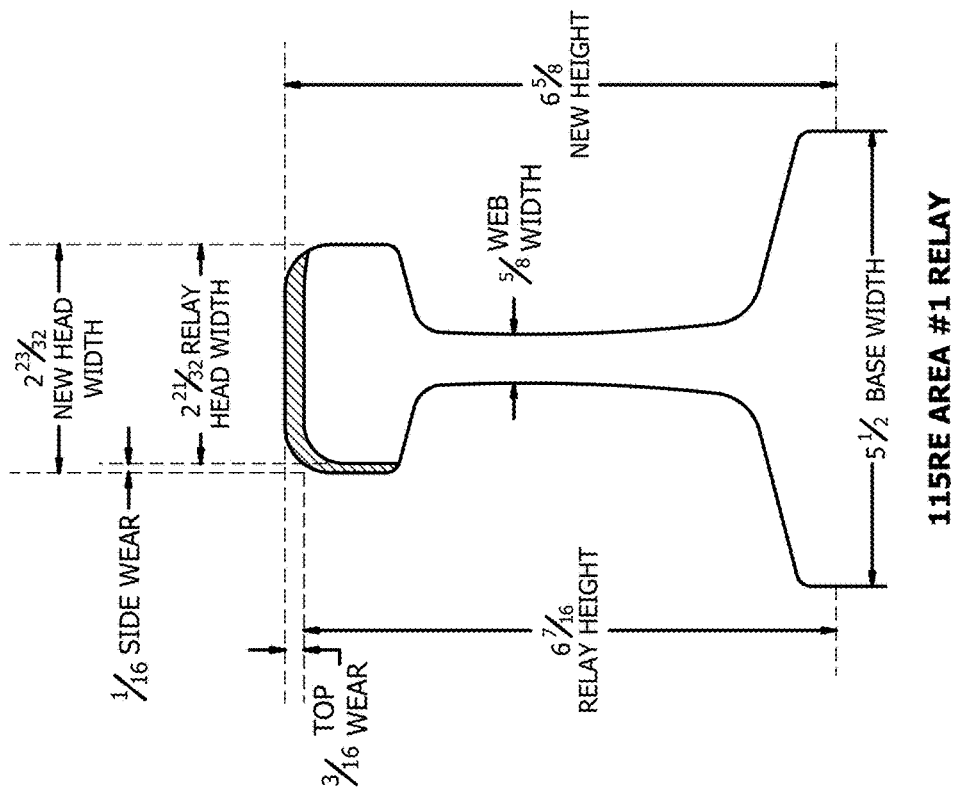
Figure 15A:
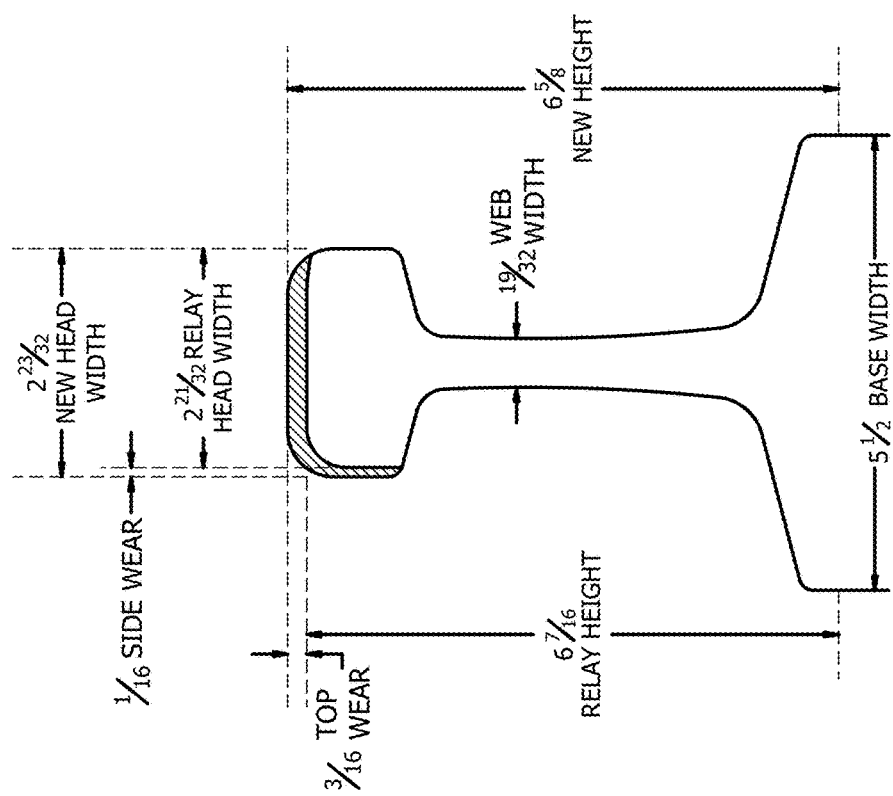
Figure 15D:
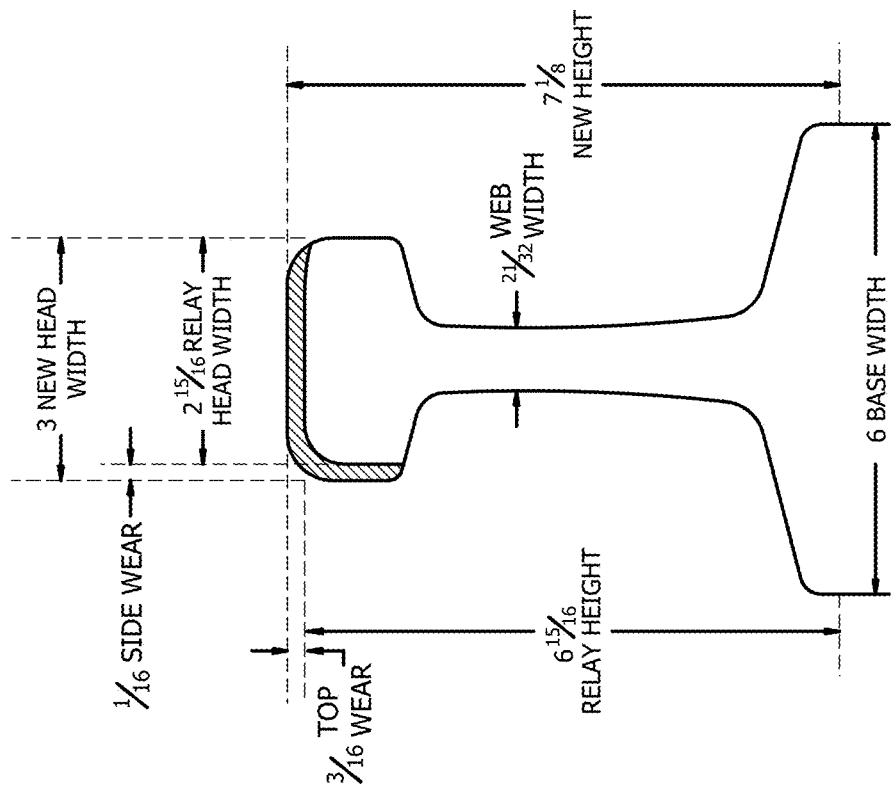
Figure 15C:
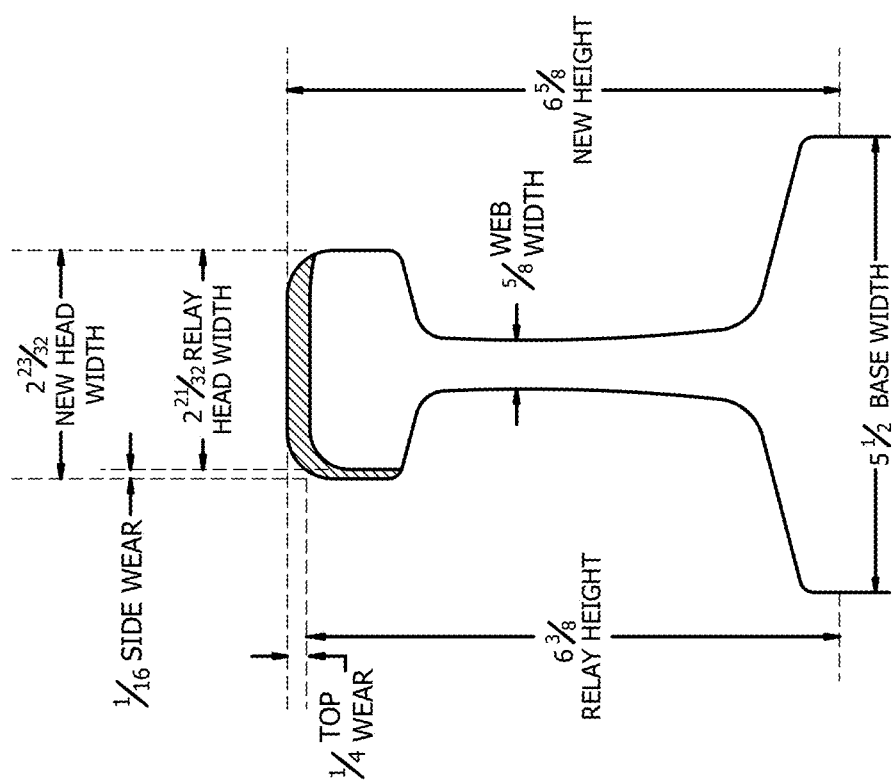
Figure 15H:
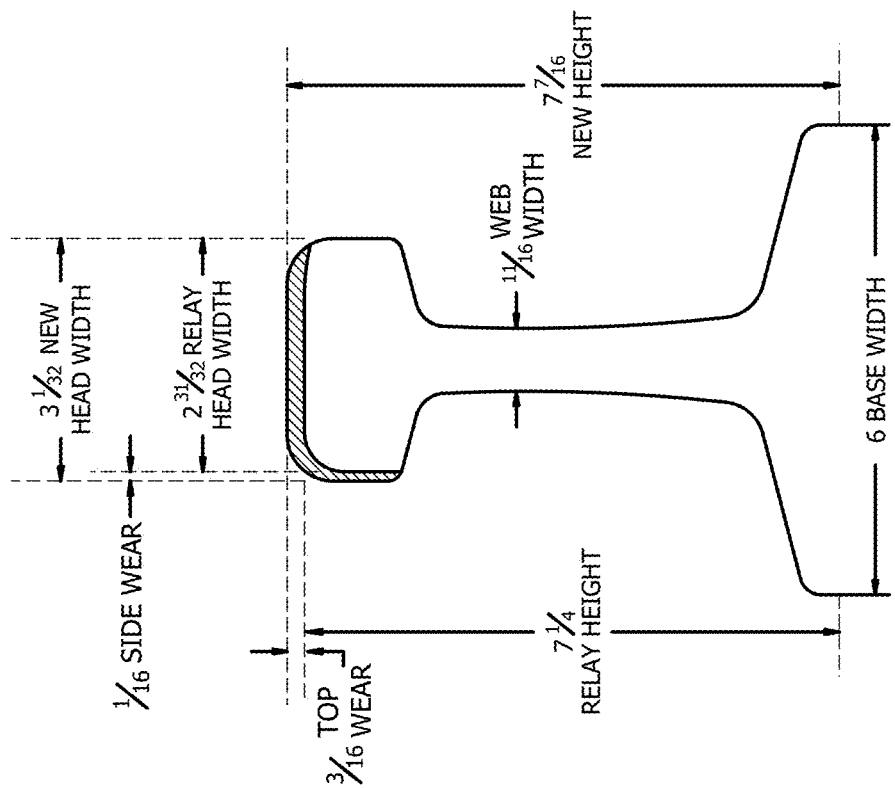
Figure 15G:
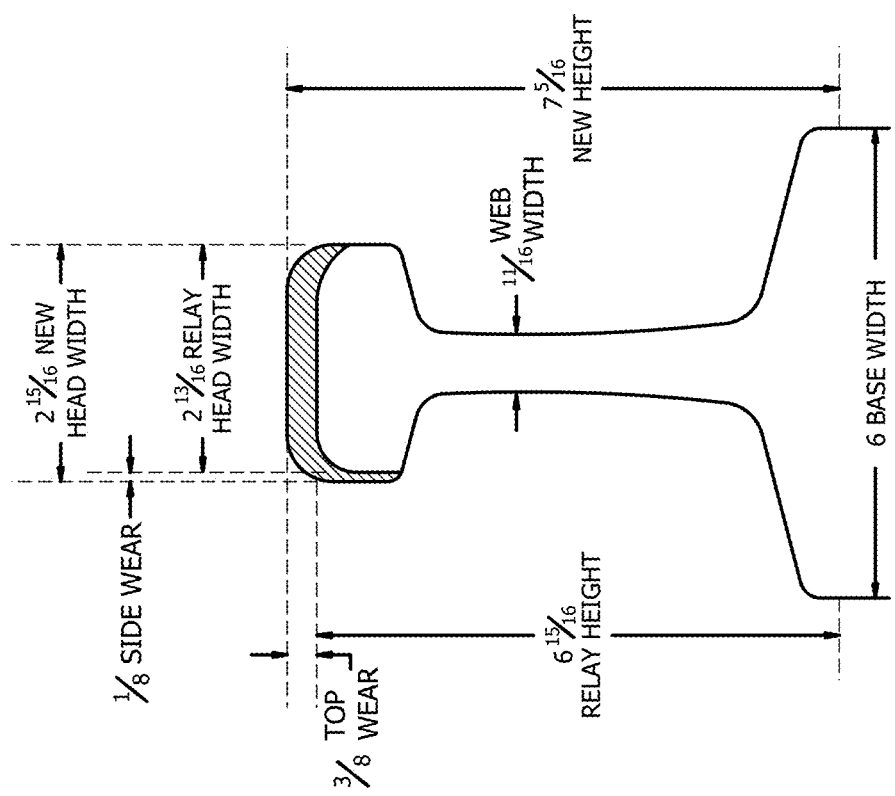

FIG. 8 depicts proper final vertical weld alignment (post-weld) created by the system after the weld is made, cooled to ambient temperature and ready for use in one embodiment. These measurements are utilized because of the method of measuring a weld. When measured with a straight edge a typical post-crown specification is 0.030"-0.060". Those measurements are taken with the 36" straight edge centered and held down on one side of the weld, thus the reason for the typical crown from a horizontal line is shown to be half of those values.

FIG. 9 depicts proper initial vertical alignment (pre-weld) for insert welding on both welds required to install the insert into the existing rails in one embodiment. All forces required to create proper vertical alignment of a weld in this system occur within the defined distance of the outer most adjustable reference points and therefore allows the installation of a piece of rail greater than the distance from the weld line to the outer most adjustable reference point (+/−39") to be done accurately and consistently. In one embodiment the system is automated. The figures shown consider that the welds will cool and lower the crown values shown for pre-weld alignment on a rail Insert, for final weld geometry.

FIG. 10 depicts proper final vertical alignment (post-weld) for insert welding on both welds required to install the insert into the existing rails after the welds are cooled to ambient temperature and ready for use in one embodiment. This is again made possible by the forces utilized in this system to create proper vertical alignment being contained within the outer most adjustable reference points.

FIG. 11 depicts a standard 115 lbs/yard rail section and 5 different cross sectional wear patterns ranging from 1-5 MM of head loss in one embodiment. The head loss depicted in these drawings maintains the same geometry of the original new rail. This is not the most ideal for matching gauge face wear that occurs from the wheel/rail interface but, it allows the insert to be utilized wherever the head loss matches, and the gauge faces of the Insert can be Finish Ground into tolerance/specifications of the host railroad/customer.

FIG. 12 depicts a standard 115 lbs/yard rail section and 5 different cross sectional wear patterns ranging from 1-5 MM of head loss and incorporates a corresponding gauge face loss in one embodiment. This requires additional criteria to be met to carefully select the Insert for the existing rail that it is to be welded into but, it will minimize the amount of Finish Grinding required in the field and provide a better product for the railroad/customer, completed in a shorter amount of track time required to complete the repair. As technology grows and track testing data is integrated into a more complete data set, there is potential to ensure that inserts can be made that match the existing rails within the current American Railway Engineering Maintenance Association (AREMA) standard for mismatch of rails to be welded of both 1/16" on head loss and 1/16" of gauge face loss. This would require the combination of the current, but separate, Ultrasonic Testing and Rail Profile Measurement Testing to be combined and identify the proper insert to match the existing rail profile, to best match the existing rail in which each specific UT defect is found.

FIG. 13 depicts a standard 136 lbs/yard rail section and 5 different cross sectional wear patterns ranging from 1-5 MM of head loss in one embodiment. The head loss depicted in these drawings maintains the same geometry of the original new rail. This is not the most ideal for matching gauge face wear that occurs from the wheel/rail interface but, it allows the insert to be utilized wherever the head loss matches, and the gauge faces of the Insert can be Finish Ground into tolerance/specifications of the host railroad/customer.

FIG. 14 depicts a standard 136 lbs/yard rail section and 5 different cross sectional wear patterns ranging from 1-5 MM of head loss and incorporates a corresponding gauge face loss in one embodiment. This requires additional criteria to be met to carefully select the Insert for the existing rail that it is to be welded into but, it will minimize the amount of Finish Grinding required in the field and provide a better product for the railroad/customer, completed in a shorter amount of track time required to complete the repair. As technology grows and track testing data is integrated into a more complete data set, there is potential to ensure that inserts can be made that match the existing rails within the current American Railway Engineering Maintenance Association (AREMA) standard for mismatch of rails to be welded of both 1/16" on head loss and 1/16" of gauge face loss. This would require the combination of the current, but separate, Ultrasonic Testing and Rail Profile Measurement Testing to be combined and identify the proper insert to match the existing rail profile, to best match the existing rail in which each specific UT defect is found.

FIG. 15 depicts a potential gradation of used rails to be Ultrasonically Tested and cut into 60"-39" Inserts in one embodiment. One benefit of being able to use such smaller inserts is because not all rail sections that are currently in use in the tracks across North America are still being produced today. To maintain tracks with out-of-date rail sections, a railroad typically relays a 400'-1,600' section of the out-of-date rail with new rail of a different/currently manufactured rail section. They then need to weld a transition rail on each end to smoothly change from the old rail section to the new rail section and then back to the old rail section again. Today, the displaced rail is then cut into seed rails of 13', 20' and even up to 80' in some circumstances. It is then installed in these lengths and welded into the track to remove defects/repair the older rails. By ultrasonically testing the displaced rails and cutting them into 60"-39" Inserts, the number of defects that can be removed from the older existing rail is greatly enhanced/increased. The longer lengths were truly only specified/required because of the current methods of creating proper weld geometry required rail weight far beyond the weld line and EFB welding head itself to consistently create proper weld geometry via gravity and shims, a hydraulic jack, a lifting mechanism incorporated into the welding head or a lifting system integrated into an external rail puller.

Figure 16:
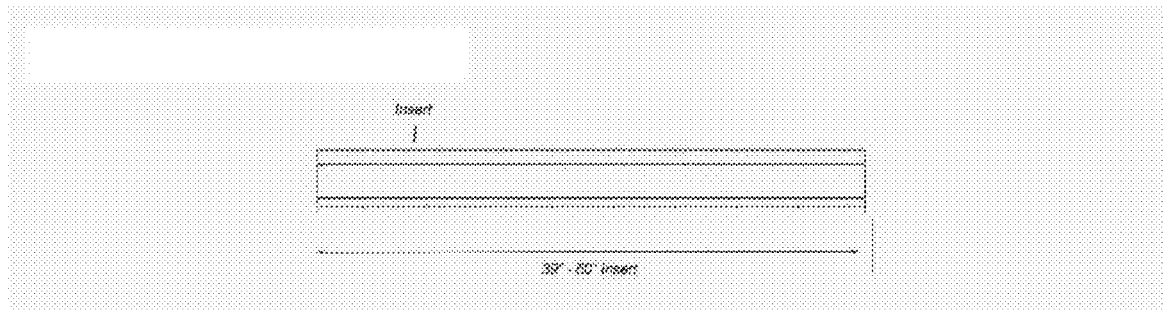
FIG. 16 depicts a standard 39" to 60" Insert side view in one embodiment.

FIG. 16 depicts an Insert from a side view that is 39"-60" long and can be cut into the appropriate length to be installed in-track and perform welds in the crib between the ties at both ends in one embodiment. As noted, due to the comparatively smaller inserts that can now be utilized, smaller amounts of track need to be produced or sourced from previously used track.

Figure 17:
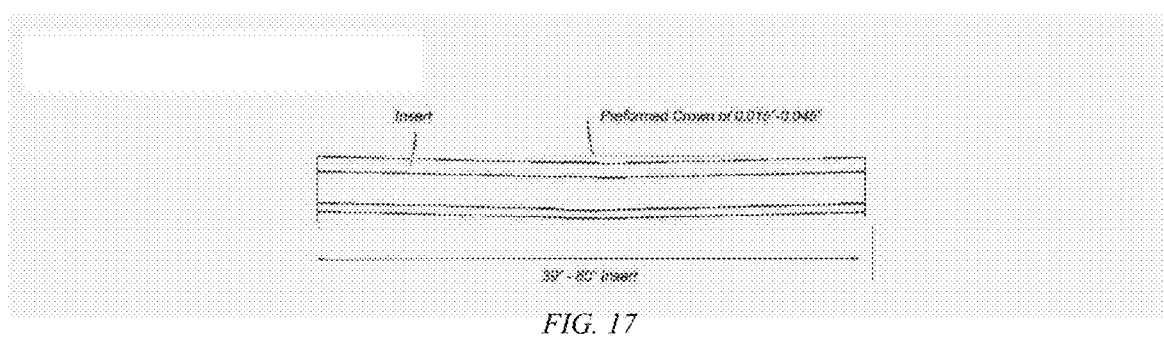
FIG. 17 depicts a pre-crowned 39" to 60" Insert side view achieved by pressing the Insert into form in one embodiment.

FIG. 17 depicts an Insert from a side view that is 39'-60" long and can be cut into the appropriate length to be installed in-track and perform welds in the crib between the ties at both ends in one embodiment. This figure also depicts a pre-crowning of the insert integrated into the longitudinal axis of partially warn rails or new rails after the desired profile has been milled or ground into the Insert. The preferred pre-crowning measurement would be 0.015" to 0.045" when measured with a straight edge over the length of the insert.

Figure 18:
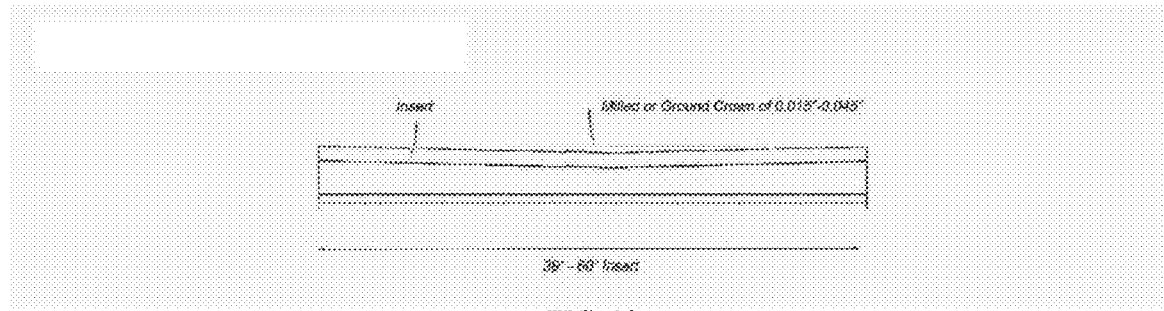
FIG. 18 depicts a pre-crowned 39"-60" Insert side view achieved by incorporating the desired crown range into the Insert profile process in one embodiment.

FIG. 18 depicts an Insert from a side view that is 39'-60" long and can be cut into the appropriate length to be installed in-track and perform welds in the crib between the ties at both ends in one embodiment. This figure also depicts a pre-crowning of the insert integrated into the longitudinal axis of partially warn rails or new rails during the desired milling or grinding of the rail profile into the Insert. The preferred pre-crowning measurement would be 0.015" to 0.045" when measured with a straight edge over the length of the insert.

Figure 19:
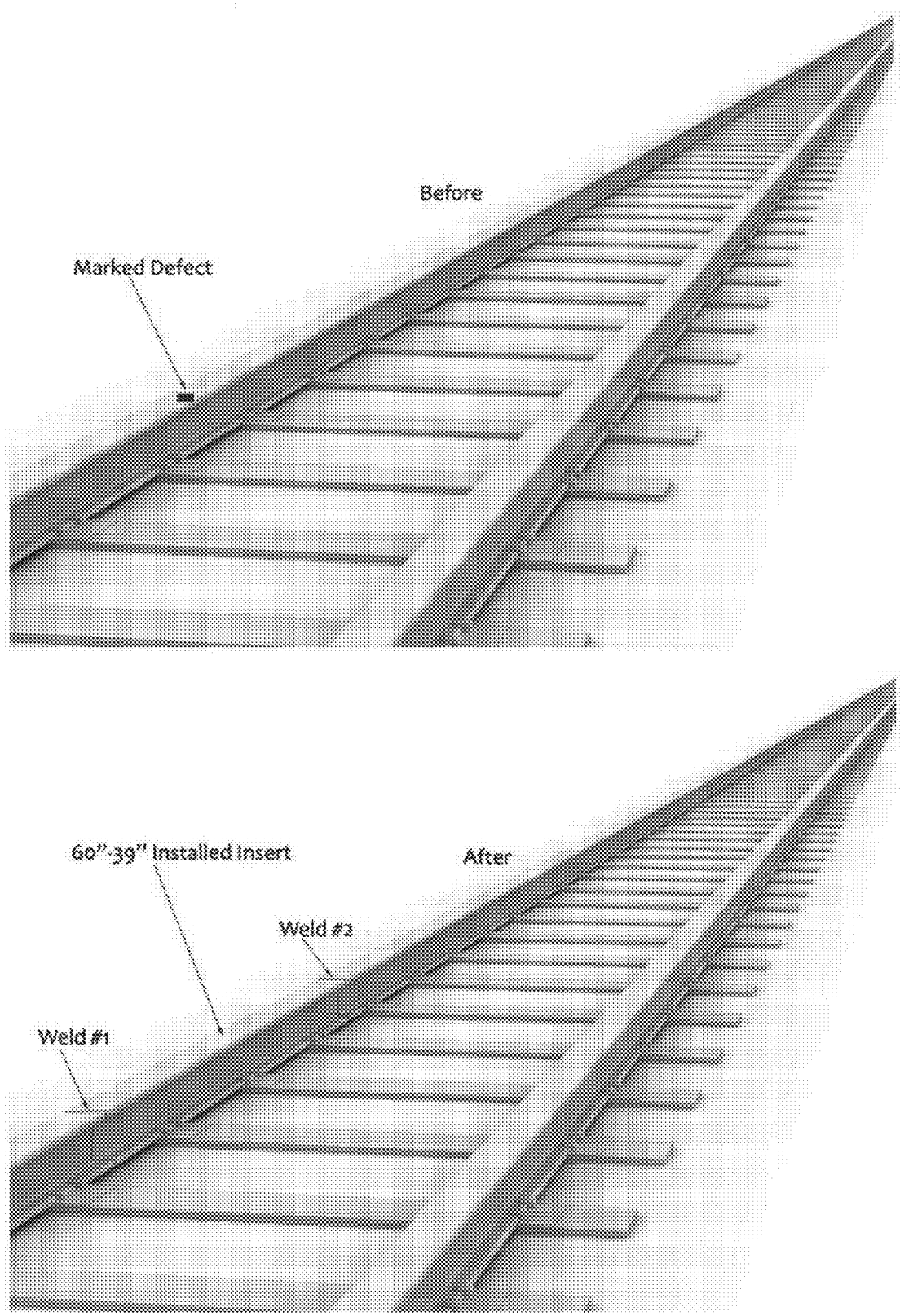
FIG. 19 depicts a track that had a defect repaired by a 60"-39" Insert in one embodiment.

FIG. 19 depicts a track that had a defect identified and that defect repaired by installing a 60"-39" Insert in one embodiment. The defect would be cut out of the existing rail by cutting the rail to the two nearest cribs to the end of the length of the 60"-39" Insert. The rail insert is then selected based on meeting the tolerances of the host railroad/customer and cut to match the gap created in the existing rail plus 1" to allow for rail consumption. If the ambient temperature of the existing rail is cooler than the Preferred Rail Laying Temperature (PRLT) for that railroad, the thermal expansion calculation must be utilized to determine how much additional rail is to be removed from the insert. The first weld would then be made utilizing the automated vertical alignment/crowning system, leaving a weld that is within specifications. You must wait for the first weld to cool below 700 degrees Fahrenheit before starting the second weld. The second weld will be a closure weld and will require additional tonnage force applied by an external rail puller. An external rail puller does not interfere with the performance of the automated vertical alignment/crowning system in this disclosure.

Now a brief method of using the system described herein will be addressed. As noted the system comprises a mobile welding apparatus which has a left side and a right side. There is a first pair of adjustable reference points on the left side. As noted, these reference points can be adjusted hydraulically, mechanically, electrically, etc. Virtually any method of adjusting points can be utilized.

The system also includes a first lifting mechanism positioned between the first pair of adjustable reference points. This allows an upward force to be applied which can be counter-acted by the reference points.

The system also includes a second pair of adjustable reference points on the right side, along with a corresponding second lifting mechanism positioned between the second pair of adjustable reference points. The system includes a welding line positioned between the first and second pair of adjustable reference points. The welding line is the location where the weld is made.

Taking the system described herein, the length of an insert is determined. A first end of a rail and a second end of a rail are to be welded together. A calculation is made as to the necessary crown and vertical alignment, taking into account subsequent cooling.

The four adjustable reference points are adjusted as necessary to achieve the desired vertical alignment. This can be accomplished manually or automatically.

Next, two segments of rail are inserted into the system. The outermost points of contact are used as a fulcrum. Contact with each reference point can be ensured via a sensor.

Next, the lifting mechanisms apply a force to ensure proper alignment of the rails with the reference points. Once in the proper position, the lifting mechanism can release assuming there are jaws to hold the rails in the desired place.

Thereafter, the two segments are welded using electric flash-butt welding. The pieces are subsequently released. The system is then repositioned in the next segment to be welded.

As noted, since the system and method disclosed herein allows the vertical alignment and horizontal alignment of the weld to be defined and controlled throughout the entire weld process within the confines of the outer most reference points incorporated within the welding head, it also creates the ability to weld shorter pieces of rail together than typical standards. One benefits, as discussed, is that a short piece of rail/"Insert" may now be welded into the existing rail with a high level of accuracy and repeatability. These comparatively shorter inserts can be utilized to repair most defects found in track by installing a short insert as opposed to as 12'6" to 40' plug rail. The power and logistics required to gather and transport a 40' plug rail are enormous. Using a 39" insert instead saves material, transportation costs, storage costs, and installation costs. Rather than using a rail car to transport such a large plug, simple fork lifts can be used move and store 39" inserts. The ability to use smaller, and therefore lighter, inserts drastically reduces costs and logistic hurdles.

Further, as noted, often finding material to manufacture the insert is difficult. Having a comparatively smaller insert means less of that difficult-to-find material is needed. This means more inserts can be made to repair track than was previously allowed.

While the invention has been particularly shown and described with reference to a preferred embodiment, it will be understood by those skilled in the art that various changes in form and detail may be made therein without departing from the spirit and scope of the invention.

What is claimed is:

1. A system for a welding apparatus, said system comprising:
   a mobile welding apparatus comprising a left side and a right side;
   a first pair of adjustable reference points on said left side;
   a first lifting mechanism positioned between said first pair of adjustable reference points;
   a second pair of adjustable reference points on said right side;
   a second lifting mechanism positioned between said second pair of adjustable reference points;
   a welding line positioned between said first pair and said second pair of adjustable reference points;
   wherein each adjustable reference point is independently adjustable;
   wherein said second lifting mechanism is hydraulic and moves in a vertical direction toward and away from a first workpiece, wherein said second lifting mechanism is capable of applying an upward force on said first workpiece, and wherein said second pair of adjustable reference points applies an opposing downward force on said first workpiece;
   wherein said first lifting mechanism is hydraulic and moves in a vertical direction toward and away from a second workpiece, and wherein said first lifting mechanism is capable of applying an upward force on said second workpiece, and wherein said first pair of adjustable reference points applies an opposing downward force on said second workpiece;
   and wherein said first pair of adjustable reference points are independently adjustable relative to said second lifting mechanism.

2. The system of claim 1 wherein at least one of said adjustable reference points is hydraulic.

3. The system of claim 1 wherein at least one of said adjustable reference points is mechanically adjusted.

4. The system of claim 1 wherein at least one of said adjustable reference points is electrically adjusted.

5. The system of claim 1 wherein said first workpiece comprises a first rail and wherein said second workpiece comprises a second rail, wherein said first rail is positioned between said first pair of adjustable reference points on the left side, and wherein said second rail is positioned between said second pair of adjustable reference points on the right side.

6. The system of claim 5 wherein said first and second lifting mechanism apply an upward force against said first and second rails.

7. The system of claim 6 wherein said adjustable reference points provide a downward force to counteract said upward force from said first and second lifting mechanisms.

8. The system of claim 5 further comprising a clamping cylinder. to keep the rails in the desired location.

9. The system of claim 5 wherein said clamping cylinder keeps each rail in position to weld the rail ends at the welding line.

10. The system of claim 5 further comprising at least one sensor to determine if a rail is in contact with at least one adjustable reference point.

11. The system of claim 5 wherein said first rail has a length of between 39 and 60 inches.

12. The system of claim 11 wherein said first rail comprises a used rail section.

13. The system of claim 12 wherein said first rail is ultrasonically tested prior to use.

14. The system of claim 1 wherein said system is mobile.

15. The system of claim 1 further comprising a central shaft which is approximately perpendicular to said first pair of adjustable reference points.

16. The system of claim 15 wherein said central shaft has a diameter of approximately 8 inches.

17. The system of claim 1 wherein said welding apparatus comprises an electric flash-butt welding apparatus.

* * * * *